(12) United States Patent
Suzuki et al.

(10) Patent No.: US 7,490,583 B2
(45) Date of Patent: Feb. 17, 2009

(54) FULL-TYPE ROLLING BEARING AND ROLLER CAM FOLLOWER FOR ENGINE

(75) Inventors: Tadatoshi Suzuki, Iwata (JP); Kenichi Ichikawa, Iwata (JP); Kikuo Maeda, Kuwana (JP); Yukio Fujii, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/686,766

(22) Filed: Oct. 17, 2003

(65) Prior Publication Data
US 2004/0079310 A1 Apr. 29, 2004

(30) Foreign Application Priority Data
Oct. 17, 2002 (JP) ............... 2002-303036
Feb. 28, 2003 (JP) ............... 2003-053505

(51) Int. Cl.
*F01L 1/18* (2006.01)
(52) U.S. Cl. ............ 123/90.44; 123/90.15; 123/90.16; 123/90.39; 74/53; 74/567
(58) Field of Classification Search ... 123/90.15–90.18, 123/90.39–90.47; 74/53–55, 567, 568 R, 74/569, 25
See application file for complete search history.

(56) References Cited

U.S. PATENT DOCUMENTS

| | | | |
|---|---|---|---|
| 3,954,517 A | 5/1976 | Jatczak et al. | |
| 4,162,419 A | 7/1979 | DeAngelis | |
| 4,930,909 A | 6/1990 | Murakami et al. | |
| 4,971,634 A | 11/1990 | Shibata et al. | |
| 5,085,733 A * | 2/1992 | Mitamura | 148/319 |
| 5,129,966 A | 7/1992 | Rao | |
| 5,137,375 A | 8/1992 | Murakami et al. | |
| 5,180,450 A | 1/1993 | Rao | |
| 5,338,377 A | 8/1994 | Mitamura et al. | |
| 5,352,303 A | 10/1994 | Murakami et al. | |
| 5,375,323 A | 12/1994 | Sata | |

(Continued)

FOREIGN PATENT DOCUMENTS

CN 1421541 A 6/2003

(Continued)

OTHER PUBLICATIONS

Kim et al., Influence of Subzero and Shot peening Treatments on Impact and Fatigue Fracture Properties of Case Hardened Steels, J. Heat Treat., v 2, n 1, p. 43-53, Jun. 1981 (Abstract).*

(Continued)

*Primary Examiner*—Thomas Denion
*Assistant Examiner*—Zelalem Eshete
(74) *Attorney, Agent, or Firm*—McDermott Will & Emery LLP

(57) ABSTRACT

A full-type rolling bearing that can be used under the conditions of high-speed, heavy-load and lowered viscosity of lubricating oil is provided. The full-type rolling bearing is formed of an outer ring, an inner ring and rollers made of steel, at least one of the outer ring, inner ring and rollers has a carbonitrided layer in its surface layer, and the austenite crystal grain size number of the surface layer is larger than 10.

29 Claims, 13 Drawing Sheets

U.S. PATENT DOCUMENTS

| | | | |
|---|---|---|---|
| 5,413,643 | A | 5/1995 | Murakami et al. |
| 5,427,457 | A | 6/1995 | Furumura et al. |
| 5,427,600 | A | 6/1995 | Itoh et al. |
| 5,456,136 | A | 10/1995 | Yamashita et al. |
| 5,456,766 | A | 10/1995 | Beswick et al. |
| 5,595,610 | A | 1/1997 | Maeda et al. |
| 5,611,250 | A | 3/1997 | Narai et al. |
| 5,658,082 | A | 8/1997 | Tsushima et al. |
| 5,772,956 | A | 6/1998 | Hasegawa et al. |
| 5,775,280 | A * | 7/1998 | Schmidt et al. .......... 123/90.41 |
| 5,803,993 | A * | 9/1998 | Yoshida et al. .............. 148/320 |
| 5,848,846 | A | 12/1998 | Sugiyama et al. |
| 5,853,249 | A | 12/1998 | Maeda et al. |
| 5,944,916 | A | 8/1999 | Chung |
| 5,972,130 | A | 10/1999 | Underys et al. |
| 5,979,383 | A * | 11/1999 | Faville et al. ............. 123/90.36 |
| 6,012,851 | A * | 1/2000 | Hirakawa et al. .......... 384/569 |
| 6,086,686 | A | 7/2000 | Tanaka et al. |
| 6,095,692 | A * | 8/2000 | Takemura ................... 384/492 |
| 6,149,734 | A | 11/2000 | Isogai et al. |
| 6,158,263 | A * | 12/2000 | Maeda et al. ................. 72/237 |
| 6,165,289 | A | 12/2000 | Matsumoto et al. |
| 6,224,688 | B1 * | 5/2001 | Takemura et al. .......... 148/318 |
| 6,251,198 | B1 | 6/2001 | Koo et al. |
| 6,258,179 | B1 | 7/2001 | Takayama et al. |
| 6,290,398 | B1 | 9/2001 | Fujiwara et al. |
| 6,306,227 | B2 | 10/2001 | Okayama et al. |
| 6,328,009 | B1 * | 12/2001 | Brothers ................. 123/90.35 |
| 6,342,109 | B1 * | 1/2002 | Takemura et al. .......... 148/319 |
| 6,423,158 | B1 | 7/2002 | Maeda et al. |
| 6,440,232 | B1 * | 8/2002 | Takemura et al. .......... 148/319 |
| 6,447,619 | B1 | 9/2002 | Takayama et al. |
| 6,488,789 | B2 | 12/2002 | Tajima et al. |
| 6,532,920 | B1 * | 3/2003 | Sweetnam et al. ....... 123/90.16 |
| 6,582,532 | B1 | 6/2003 | Kurebayashi et al. |
| 6,602,358 | B1 | 8/2003 | Ochi et al. |
| 6,641,680 | B2 | 11/2003 | Nishimori et al. |
| 6,699,335 | B2 | 3/2004 | Murakami et al. |
| 6,855,217 | B2 | 2/2005 | Suzuki |
| 7,147,382 | B2 | 12/2006 | Suzuki et al. |
| 2002/0082133 | A1 | 6/2002 | Yoshikawa et al. |
| 2002/0088511 | A1 | 7/2002 | Nakamura et al. |
| 2003/0037635 | A1 | 2/2003 | Tsuchiyama et al. |
| 2003/0040401 | A1 | 2/2003 | Okita et al. |
| 2003/0075244 | A1 | 4/2003 | Kurebayashi et al. |
| 2003/0123769 | A1 | 7/2003 | Ohkl |
| 2004/0170348 | A1 | 9/2004 | Okugami et al. |
| 2004/0170761 | A1 | 9/2004 | Li et al. |
| 2004/0179761 | A1 | 9/2004 | Ohki et al. |
| 2004/0228561 | A1 | 11/2004 | Okugami et al. |
| 2005/0045247 | A1 | 3/2005 | Ohki |
| 2005/0109308 | A1 | 5/2005 | Suzuki et al. |
| 2005/0205163 | A1 | 9/2005 | Ohki et al. |
| 2007/0034301 | A1 | 2/2007 | Hasegawa et al. |
| 2007/0169850 | A1 | 7/2007 | Ohki et al. |

FOREIGN PATENT DOCUMENTS

| | | |
|---|---|---|
| DE | 42 04 982 A1 | 8/1993 |
| DE | 1 996 0803 | 6/2000 |
| DE | 1 025 4635 | 6/2003 |
| EP | 0 458 646 | 11/1991 |
| EP | 0 600 421 A1 | 6/1994 |
| EP | 0 626 468 | 11/1994 |
| EP | 0 723 034 | 7/1995 |
| EP | 0 811 789 | 12/1997 |
| EP | 0 811 789 A1 | 12/1997 |
| EP | 0 950 723 | 10/1999 |
| EP | 0 950 723 A1 | 10/1999 |
| EP | 1 070 760 A2 | 1/2001 |
| EP | 1 158 064 | 11/2001 |
| EP | 1 273 672 | 1/2003 |
| EP | 1 411 142 A1 | 4/2004 |
| FR | 2 841 907 | 1/2004 |
| GB | 2 258 274 | 2/1993 |
| GB | 2 258 274 A | 2/1993 |
| JP | 48-028308 | 4/1973 |
| JP | 63-185917 | 11/1988 |
| JP | 02-125841 A | 5/1990 |
| JP | 2-190615 | 7/1990 |
| JP | 03-116706 | 12/1991 |
| JP | 4-254574 | 9/1992 |
| JP | 05-009584 | 1/1993 |
| JP | 5-163563 | 6/1993 |
| JP | 5-179350 | 7/1993 |
| JP | 5-263091 | 10/1993 |
| JP | 6-101424 | 4/1994 |
| JP | 06-117438 A | 4/1994 |
| JP | 6-247253 | 9/1994 |
| JP | 6-286577 | 10/1994 |
| JP | 6-341441 | 12/1994 |
| JP | 07-027139 A | 1/1995 |
| JP | 08004774 A | 1/1996 |
| JP | 8-49057 | 2/1996 |
| JP | 08-233070 | 9/1996 |
| JP | 09-053148 A | 2/1997 |
| JP | 9-176740 | 7/1997 |
| JP | 9-316601 | 12/1997 |
| JP | 9-329139 | 12/1997 |
| JP | 10-030150 | 2/1998 |
| JP | 10-47334 | 2/1998 |
| JP | 10-68419 | 3/1998 |
| JP | 10-103339 | 4/1998 |
| JP | 10-110720 | 4/1998 |
| JP | 10-168515 A | 6/1998 |
| JP | 10-184701 | 7/1998 |
| JP | 10-204612 | 8/1998 |
| JP | 11-80897 | 3/1999 |
| JP | 11101247 A | 4/1999 |
| JP | 11-140543 A | 5/1999 |
| JP | 11-303874 | 11/1999 |
| JP | 2000-038906 A | 2/2000 |
| JP | 2000-38907 A | 2/2000 |
| JP | 2000-54810 | 2/2000 |
| JP | 2000-129347 A | 5/2000 |
| JP | 2000-205284 | 7/2000 |
| JP | 2000-212721 A | 8/2000 |
| JP | 2001-123244 | 5/2001 |
| JP | 2001-200314 A | 7/2001 |
| JP | 2002-31212 A | 1/2002 |
| JP | 2002-070872 | 3/2002 |
| JP | 2002-120508 | 4/2002 |
| JP | 2002-180203 A | 6/2002 |
| JP | 2002-194438 A | 7/2002 |
| JP | 2002-256336 A | 9/2002 |
| JP | 2002-339054 | 11/2002 |
| JP | 2003-56315 | 2/2003 |
| JP | 2003-083337 | 3/2003 |
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| WO | WO 91/00929 | 1/1991 |
| WO | WO 02/40730 A1 | 5/2002 |

OTHER PUBLICATIONS

Embrittlement of Steel: Hydrogen Damage[online][retrieved Dec. 23, 2005]. Retrieved from the internet: <http://products.asminternational.org/hbk/index.jsp>.

Hardenability of carbon and Low-Alloy Steels: Effect of Grain Size [online] [retrieved Dec. 23, 2005]. Retrieved fro the internet: <http://products. Asminternatiooonal. Org/hbk/index.jsp>.

JIS G 0551 "Methods of austenite grain size determination for steel", Published by Japanese Standards Association, Feb. 20, 1998.

JIS Z 2242 "Method of impact test for metallic materials", Published by Japanese Standards Association, Dec. 21, 1998.

JIS Z 2202 "Test pieces for impact test metallic materials" Published by Japanese Standards Association, Feb. 20, 1998.

Co-pending U.S. Appl. No. 10/300,590, filed Nov. 21, 2002.

Japanese Office Action for Corresponding Japanese Patent Application No. 2002-194775, dispatched Mar. 22, 2006.

Japanese Office Action for Corresponding Japanese Patent Application No. 2002-194793, dispatched Mar. 22, 2006.

Japanese Office Action issued in corresponding Japanese Patent Application No. 2002-303036, dated Oct. 24, 2006.

Japanese Office Action issued in Japanese Patent Application No. JP 2002-194804, dated Nov. 28, 2006.

Japanese Office Action issued in Japanese Patent Application No. JP 2002-194921, dated Nov. 28, 2006.

Japanese Office Action issued in Japanese Patent Application No. JP 2003-209737, dated Feb. 6, 2007.

Japanese Office Action issued in Japanese Patent Application No. JP 2002-194804, dated Mar. 20, 2007.

European Search Report issued in European Patent Application No. EP 05 70 3409, mailed Apr. 4, 2007.

Chinese Office Action, with English translation, issued in Chinese Patent Application No. CN 200410008248.9, mailed Apr. 27, 2007.

Annual Book of ASTM Standards 2003, vol. 03.01, Designation: E112-96$^{62}$; "Standard Test Method for Determining Average Grain Size m", pp. 256-281.

U.S. Office Action issued in U.S. Appl. No. 10/787,221, dated Oct. 26, 2007.

Japanese Office Action, with English translation, issued in Japanese Patent Application No. JP 2004-053995 dated on Jun. 17, 2008.

Chinese Office Action, with English translation, issued in Chinese Patent Application No. CN 200610004620.8, mailed Sep. 5, 2008.

"Technical Means for Improvement of Service Life of a Rolling Bearing", Bearing, 2001, pp. 1, 2, 5 and 45, No. 5, and partial English translation.

Metallic Material Refining Technology, May 1995, p. 47, and partial English translation.

\* cited by examiner 0.05mm 0.05mm

FULL-TYPE ROLLING BEARING AND ROLLER CAM FOLLOWER FOR ENGINE

BACKGROUND OF THE INVENTION

1. Field of the Invention

The present invention relates to full-type rolling bearings and roller cam followers for engines that have no cage, such as bearings for rocker arms, cam followers and roller follower bearings.

2. Description of the Background Art

Of recent rolling bearings, full-type roller bearings without cage like bearings for rocker arms to be used for high-speed heavy-load applications are increasing in number. In the full-type roller bearing without cage, it inevitably occurs that rollers interfere with each other. Therefore, at high speeds, the rollers are not properly controlled in terms of their positions so that skew is likely to occur. Resultant heat generation due to sliding as well as a local increase in surface pressure are likely to cause surface damages (peeling, smearing, surface-initiated peeling) and inside-initiated peeling, while the full-type roller bearing should have a high load capacity according to calculation.

More specifically, in such full-type roller bearings as roller follower, cam follower and rocker arm, the interference between rollers and poor supply of lubricant into the bearings could cause peelings initiated from the surfaces of rollers and raceways. Moreover, influences of an assembly error and a biasing load could cause skew of rollers, resulting in surface-initiated peelings due to sliding and inside-initiated peelings due to a local increase in surface pressure. The full-type roller bearing herein refers to a bearing without cage as described above and may sometimes be abbreviated as full roller bearing.

For a roller cam follower of an engine that has an outer ring with its circumference being in rolling contact with a cam, most improvements of the roller cam follower have been for the purpose of improving the circumference of the outer ring. For example, compression residual stress induced by such a process as shot peening and increased hardness induced by high-concentration carbonitriding (process-induced effects) have been used for prolonging the lifetime, chiefly for improving the circumference of the outer ring that is in rolling contact with the cam.

Although improvements with the aim of prolonging the rolling life of a roller shaft serving as an inner ring, rollers and the entire bearing have been relatively few, some improvements have still been made in terms of materials for providing heat resistance and microstructure stability as well as increased hardness that are obtained through carbonitriding, and thereby prolonging the lifetime of the bearing. There have been known techniques regarding prolonging of the lifetime of the roller cam follower for the engine:

(d1) For a cam follower bearing of an engine valve mechanism, a calculated life of the bearing, at a rated engine rpm, of 1000 hours or longer is achieved (Japanese Patent Laying-Open No. 2000-38907).

(d2) In order to achieve a bearing shaft of a cam follower with the properties of: a carbide ratio=10–25%; ratio of decomposed austenite content to initial retained austenite content=1/10–3/10; end hardness=HV 830–960; and average wavelength of surface roughness=25 μm or less, a bearing steel is carbonitrided and hard shot peened (Japanese Patent Laying-Open No. 10-47334).

(d3) A solid lubricant film of high polymer for example is formed on a cam follower shaft for improving wear resistance of the shaft (Japanese Patent Laying-Qpen No. 10-103339).

(d4) A cam follower shaft is made of a tool steel for example and is ion-nitrided or ion-plated at a temperature lower than a tempering temperature so as to have a high hardness (Japanese Patent Laying-Open No. 10-110720).

(d5) A cam follower bearing for an engine valve mechanism that has its shaft for which a bending stress is 150 MPa or less (Japanese Patent Laying-Open No. 2000-38906).

(d6) A cam follower for an engine valve mechanism that has a phosphate film which is excellent in lubricating-oil retention and provided on a rolling surface of a bearing component (Japanese Patent Laying-Open No. 2002-31212).

(d7) A cam follower for an engine valve mechanism that has a crowning in a region of a shaft where rollers roll (Japanese Utility-Model Laying-Open No. 63-185917).

(d8) A carburized shaft has a rolling surface layer which is high-concentration carburized or carbonitrided with a carbon concentration of 1.2%–1.7% and has an internal hardness of HV 300 (Japanese Patent Laying-Open No. 2002-194438).

There is another problem regarding the rocker arm as described below. In such a case that both ends of a roller shaft are caulked to be fixed to a roller supporting member, although a rolling surface of the roller shaft should have high hardness, the ends thereof should be soft enough to be caulked. Further, after the shaft ends are caulked to be fixed, the strength (hardness) should be high for preventing loosening in use. The following document discloses caulking of both ends of a roller shaft of a roller rocker.

(d9) The outer surface of a roller shaft is uniformly high-frequency induction-hardened and then tempered, and thereafter only the ends of the shaft are high-frequency annealed and accordingly softened (Japanese Patent Laying-Open No. 5-179350).

It is assumed that, the full-type roller bearings like the rocker arm, roller follower and cam follower will, similar to normal caged bearings, increase in speed and load in use, and the viscosity of a lubricating oil therefor will decrease. In order to extend the rolling life of the full-type roller bearings under such conditions in use, (a1) any measure should be taken, as usually done, for the rolling fatigue life dependent on the load and (a2) any measure should further be taken for the surface damage life due to metal contact caused by sliding and loss of an oil film. However, there has been no technique for remarkably extending both of the rolling fatigue life dependent on the load and the surface damage life due to the metal contact. Moreover, in addition to these two measures for prolonging the life, (a3) any measure should be taken for the issue of shortening of the life due to the interference of rollers with each other as well as the skew thereof that are peculiar to the full-type roller bearings.

The above-described known techniques improve the rolling life by increasing the hardness and the compression residual stress, or improve the rolling surface where a bearing component is in rolling contact with a counterpart component. In actually evaluating these techniques, it is found that they are effective for extending the life in such an application where bending is applied as in the case of the outer ring, while such improvements are not necessarily effective by themselves for extending the life of the inner ring and rollers of the full roller bearing.

SUMMARY OF THE INVENTION

An object of the present invention is, in consideration of the increased speed and load in use and the decreased viscosity of the lubricating oil, to provide a full-type rolling bearing and particularly a roller cam follower of an engine that exhibit a long life under severe lubrication, sliding and load conditions, A full-type rolling bearing according to the present invention is formed of an outer ring, an inner ring and rollers that are made of steel, at least one of the outer ring, inner ring and rollers has a carbonitrided layer in its surface layer, and the austenite crystal grain size number of the surface layer is greater than 10.

For the full-type rolling bearing of the present invention, a material with fine crystal grains and heat resistance can be used to extend the surface damage (surface-initiated exfoliation like peeling and smearing) life as well as the inside-initiated peeling life. Specifically, processing of such a material as bearing steel or heat treatment pattern is improved to produce a carbonitrided structure ensuring an austenite crystal grain size number greater than 10 defined by JIS. The resultant structure can remarkably enhance the resistance to occurrence and development of cracks. Accordingly, heat generation of the surface layer due to sliding and occurrence of surface cracks due to tangential force can be prevented. Moreover, against cracks resulting from inside-initiated peelings, the life can remarkably be extended.

The above-described microstructure is further processed and heat-treated and a compression residual stress is imposed on the surface layer to increase the hardness, so that the life can further be extended. The processing and heat treatment may be any one of, or a combination of: (b1) shot peening, (b2) barrel finishing, (b3) rolling, (b4) varnishing, (b5) carburizing and carbonitriding, (b6) carbonitriding and sub-zero treatment, and (b7) carbonitriding and secondary quenching and sub-zero treatment.

Here, the austenite crystal grain size number greater than 10 means that austenite crystal grains are fine enough to have the number greater than 10 or 11 or more which is determined according to a method of testing the austenite crystal grain size defined under JIS G 0551. When a structure is quenched from a temperature in the austenite temperature range, austenite grain boundaries remain in the quenched structure and accordingly the content of remaining austenite grains is measured, which is sometimes referred to as prior austenite grain boundaries.

At least one of the outer ring, inner ring and rollers may be carbonitrided at a carbonitriding temperature equal to or higher than the A1 transformation temperature, cooled to a temperature lower than the A1 transformation temperature and heated to a quenching temperature lower than the carbonitriding temperature and thereby quenched.

Such a microstructure is once cooled to a temperature lower than the carbonitriding temperature and then quenched from the resultant quenching temperature so that considerably fine austenite crystal grains can be obtained. This process of quenching by heating to a temperature lower than the carbonitriding temperature is sometimes called, in terms of the order of the process, secondary quenching or final quenching.

The quenching temperature may be in a temperature range at which carbide and/or nitride and an austenite phase coexist in the carbonitrided surface layer of the steel.

The quenching temperature is lower than the carbonitriding temperature, and thus the amount of un-dissolved carbide and/or nitride in the surface layer, which is influenced by the carbonitriding process, increases as compared with that in the carbonitriding process. Then, when the quenching temperature is in the temperature range where those components coexist, the ratio of un-dissolved carbide/nitride increases while the ratio of austenite decreases at the quenching temperature as compared with those ratios in the carbonitriding process. In addition, it is seen from the Fe—C binary phase diagram that, in the range where carbide (cementite) and austenite coexist, the concentration of carbon dissolved in austenite decreases as the quenching temperature decreases. As the steel for the bearing has low contents of other alloy elements like Si and Mn, the temperature region and the generated layer can be discussed with sufficient precision with reference to the Fe—C binary phase diagram. In addition, nitrogen, like carbon, is an interstitial element dissolved in iron and produces nitride with iron similar to cementite in a predetermined temperature region, and the nitrogen can be regarded approximately as the same as carbon.

When the temperature is increased to the quenching temperature, austenite grains are made fine since there remain a large amount of un-dissolved carbide and/or nitride that prevent growth of austenite grains. Moreover, the structure transformed from austenite to martensite through quenching has a somewhat low carbon concentration when the above-described heat treatment is applied, so that the structure has somewhat high toughness as compared with the structure quenched from the carbonitriding temperature. In other words, the quenched structure has (c1) a greater amount of un-dissolved carbide/nitride as compared with the structure produced through the conventional process, and (c2) a lower carbon concentration than the conventional one.

The above-discussed quenching temperature may be 790° C.–830° C. This temperature is applicable to most of steel materials to facilitate management of the sintering temperature.

Further, at least one of the outer ring, inner ring and rollers may be cold-worked before being carbonitrided.

The cold-working can be applied to increase the nucleation density of austenite grains in the heat treatment and thereby produce a fine-grain structure.

The austenite may have the grain size number of at least 11. With the defined austenite grain size, austenite grains that are extremely and unthinkably fine austenite grains contribute to achievement of stably long rolling fatigue life and surface damage life. Moreover, the issue of the decreased viscosity of the lubricating oil can satisfactory be addressed.

In at least one of the outer ring, inner ring and rollers, a compression residual stress of at least 500 MPa may be generated.

As discussed above, the microstructure can further be processed and heat-treated and a compression residual stress can be formed in the surface layer so as to further extend the life.

A roller cam follower of an engine according to the present invention includes an outer ring being in rolling contact with a cam shaft of the engine, a roller shaft located inside the outer ring and fixed to a cam follower body, and bearing elements placed between the outer ring and the roller shaft. At least one of the outer ring, roller shaft and bearing elements has a carbonitrided layer, and austenite crystal grains in at least a surface layer are made fine to have a grain size number greater than 10.

The austenite grains in the component are made fine enough to have the grain size number greater than 10, and accordingly the rolling fatigue life can considerably be improved. With the austenite grain size number of 10 or less, any remarkable improvement of the rolling fatigue life is impossible and thus the grain size number is greater than 10, and preferably 11 or greater. Although further finer austenite grains are desirable, the grain size number exceeding 13 is usually difficult to achieve. It is noted here that, the above-mentioned bearing elements located between the outer ring and the roller shaft refer to bearings including rollers or rolling elements, however, the bearing elements may be, in a narrow sense, rollers or rolling elements.

The austenite grain size number may be determined by the usual method defined by JIS, or determined according to the intercept method for example with the average grain size corresponding to the above grain size number. A smaller austenite grain size is desirable and an austenite grain size number of 11 or greater is further desirable. Alternatively, the average grain size may be 6 μm or less. The austenite grain size number may be achieved in the carbonitrided layer. In general, however, the condition of the fineness of austenite is satisfied in the body of steel located inside the carbonitrided layer.

Here, the austenite grains refer to crystal grains of austenite which is phase-transformed during the heating process, and the traces of grains remain after the austenite is transformed into martensite through cooling.

For another roller cam follower of an engine according to the present invention, at least one of an outer ring, a roller shaft and bearing elements has a carbonitrided layer and has a fracture stress of at least 2650 MPa.

The inventors of the present invention have found that, the heat treatment method (low-temperature secondary quenching method) herein described later can be used to increase the fracture stress of a steel having a carbonitrided layer to 2650 MPa or more which has not been achieved by any conventional method. In this way, a high-strength rolling bearing can be obtained to achieve excellent durability under a load condition of the roller cam follower.

For still another roller cam follower of an engine according to the present invention, at least one of an outer ring, a roller shaft and bearing elements has a carbonitrided layer and has a hydrogen content of at most 0.5 ppm, The above-described heat treatment (low-temperature secondary quenching) can be used to lower the hydrogen content in any of components before being assembled into a cam follower. Then, it is possible to shorten the time required for hydrogen entering the steel to increase and attain a critical point at which cracks occur. For this reason, together with any reasons which have not been clarified, the durability can be enhanced.

A lower hydrogen content is desirable. However, reduction of the hydrogen content to the one less than 0.3 ppm requires long-term heat treatment, resulting in increase in size of austenite grains and thus deterioration in toughness. Then, a hydrogen content is desirably in a range from 0.3 to 0.5 ppm and more desirably in a range from 0.35 to 0.45 ppm.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above mentioned range of hydrogen content is determined by thermal conductimetry. In addition, as detailed later, the measurement may be taken by means of a LECO DH-103 hydrogen determinator or like measuring device.

(c1) The cam follower body may be pivotably attached to a rotational shaft located between one end and the other end of itself, an open/close valve of the engine may abut on the one end, the other end may have a bifurcated roller supporting portion, and the roller shaft may be fixed to the bifurcated roller supporting portion.

(c2) The cam follower body may be mounted between one end and the other end of itself, having the roller shaft fixed in a roller hole extending between two sidewalls, an end of an open/close valve of the engine may abut on one end, and a pivot may abut on the other end.

(c3) The cam follower body may be pivotably attached to a rotational shaft located between one end and the other end of itself, one end of an open/close valve of the engine may abut on one end, the other end may abut on one end of an interlocking rod transmitting a stress from the cam shaft, the cam follower body is mounted on the other end of the interlocking rod, the one end and the other end of the interlocking rod being located respectively on the rocker arm and the cam, and the roller shaft may be attached to the cam follower body and abuts on the cam.

The cam follower bodies of (c1), (c2) and (c3) are common in that they transmit a driving force from the cam to the engine valve while they are different in structure to be applicable to different engine types.

Regarding the roller cam follower of the engine discussed above, the bearing elements may be full-type needle bearing. The roller shaft may have its end with a lower hardness than that of its central portion. The central portion of the roller shaft thus has a hardness necessary for serving as a rolling contact surface while the end is made soft. Accordingly, with durability like the rolling fatigue life ensured, caulking for example can be done. All of the rolling bearings described above may have an end of a roller shaft which is caulked.

Further, the cam follower body may be press-formed to improve production efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
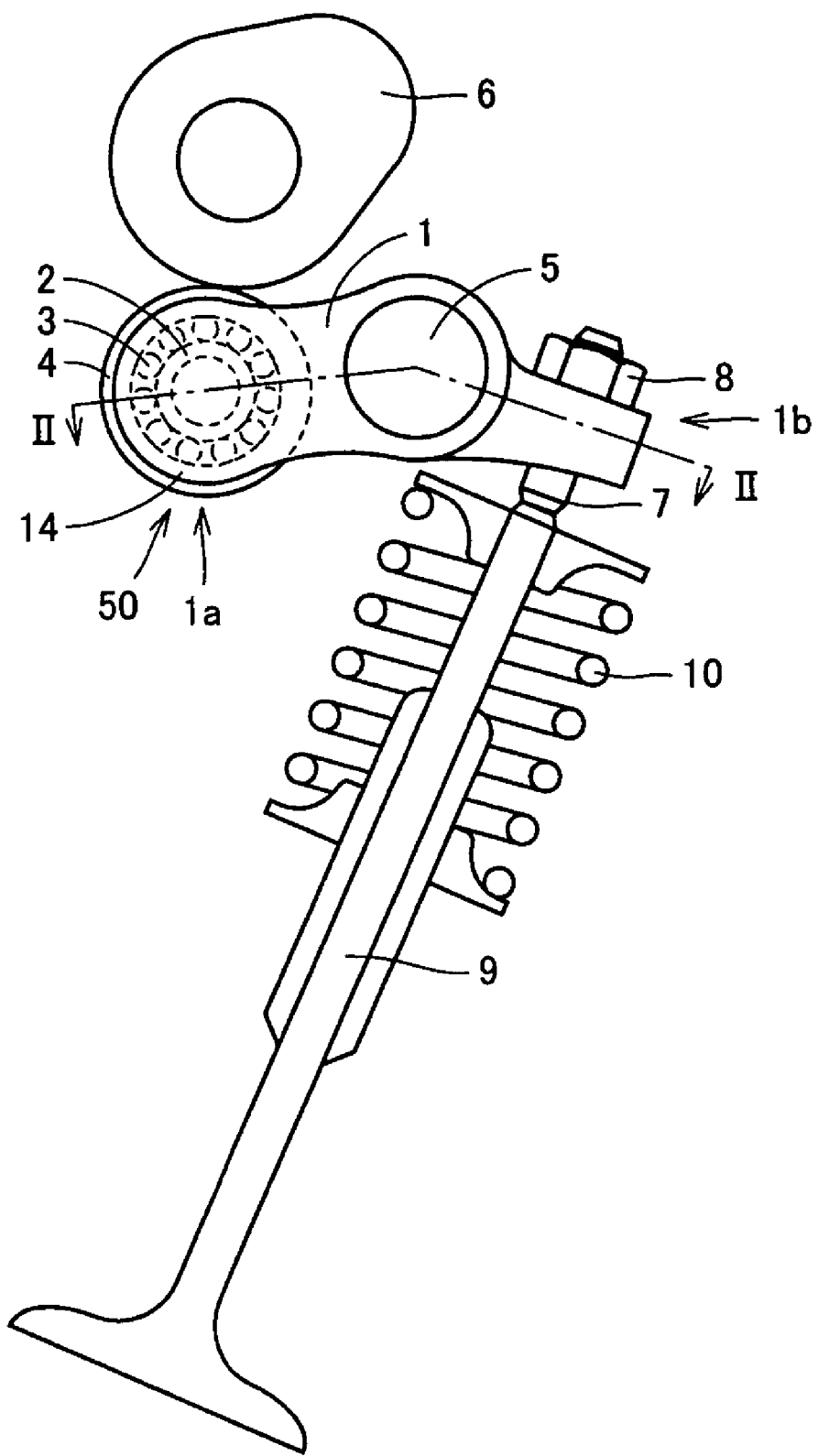
FIG. 1 shows a rocker arm bearing which is a full-type roller bearing according to an embodiment of the present invention.
Figure 2:
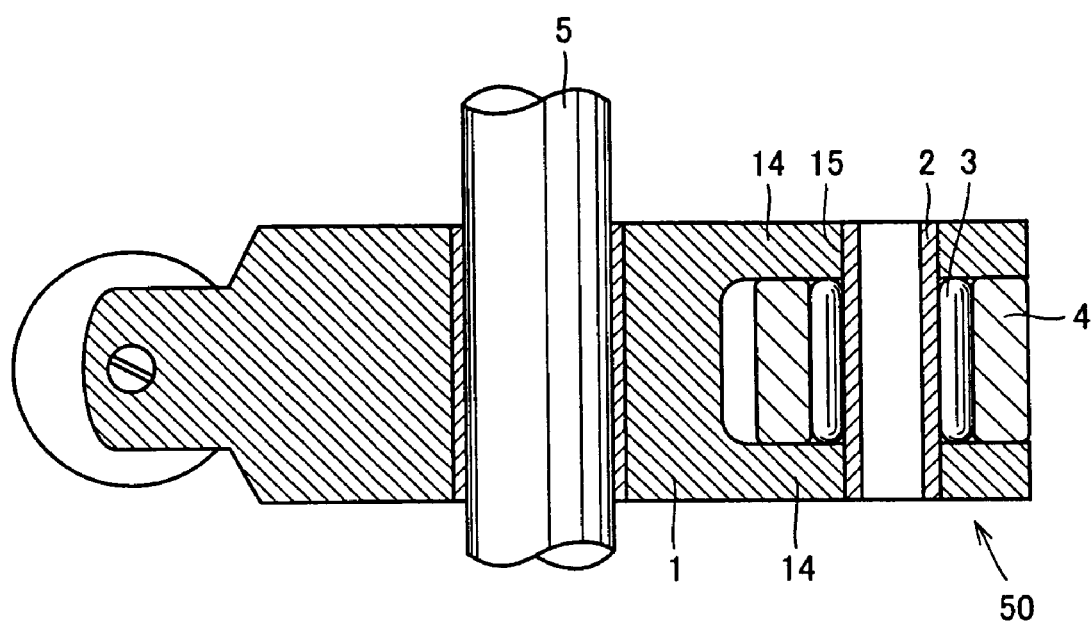
FIG. 2 is a cross-sectional view along line II—II in FIG. 1.

Embodiments of the present invention are hereinafter described in connection with the drawings. FIG. 1 is a schematic front view showing a structure of a roller cam follower of an engine according to an embodiment of the present invention. FIG. 2 is a cross-sectional view along line II—II in FIG. 1. Referring to FIGS. 1 and 2, a rocker arm 1 which is a pivot member is pivotably supported, at a central part, on a rocker arm shaft 5 via a bearing metal for example.

An adjust screw 7 is screwed into one end 1b of this rocker arm 1. Adjust screw 7 is fixed by a lock nut 8 having its lower end abutting on the upper end of an intake valve or discharge valve of an internal-combustion engine. Valve 9 is biased by elasticity of a spring 10.

Rocker arm 1 has the other end 1a provided with a body of the cam follower (cam follower body) 50, and cam follower body 50 has a bifurcated roller supporting portion 14 which is formed integrally with the body. In bifurcated roller supporting portion 14, both ends of roller shaft 2 which corresponds to an inner ring is press-fit or fixed by means of a snap ring. On a central part of the outer surface of roller shaft 2, an outer ring 4 is supported rotatably via rollers 3. Rollers 3 are placed between roller shaft 2 and outer ring 4 to serve as bearing elements. In other words, bearing elements located between roller shaft 2 and outer ring 4 are rollers. The axial direction of rollers 3 is in parallel with the axial direction of the roller shaft. The outer surface of outer ring 4 is brought into contact with the surface of cam 6 by the biasing force of spring 10. It is noted that terms "one" and "the other" herein used have no specified meaning, merely used in the order of reference in this description.

Cam follower body 50 is one specific example of full-type rolling bearings. Specifically, a rolling bearing including an inner ring formed of roller shaft 2, rolling elements formed of rollers 3 and outer ring 4 is employed as a full roller bearing for a rocker arm. In general, a bearing without cage is called full roller bearing. The above-mentioned full roller bearing for the rocker arm rotates while contacting cam 6 so that pressing force and impact force of cam 6 are exerted on outer ring 4. The roller cam follower of an engine in this embodiment is thus a member which includes the full roller bearing for the rocker arm and the cam follower body.

As the rocker arm bearing rotates while contacting cam 6, the pressing force and impact force of cam 6 are exerted on outer ring 4, possibly resulting in indentations and cracks due to repeated bending stress. In particular, with the increased engine output, the engine rpm accordingly increases so that those forces become greater resulting in a higher risk of occurrence of cracks and indentations and thus shortening of the rolling life and surface damage life.

Indentations due to exertion of a great force on the bearing are likely to be formed on the inner ring since the surface pressure between the inner ring and the rolling elements (rollers) is usually higher than the surface pressure between the outer ring and the rolling elements (rollers). For the cam follower, however, the bending stress is exerted on the outer ring while the high surface-pressure load is also exerted on the outer ring, and thus indentations are likely to be formed between the outer ring and the rolling elements. The inventors of the present invention have found that the surface damage life and the rolling life can be prolonged by forming a carbonitrided layer in a surface layer of at least one of the above-discussed components, with the austenite grain size number of the surface layer being greater than 10 for example or at least 11 in a predetermined case. In addition, the inventors have found that the extent to which the life is prolonged is increased by adding a compression residual stress to the surface layer.

Figure 3:
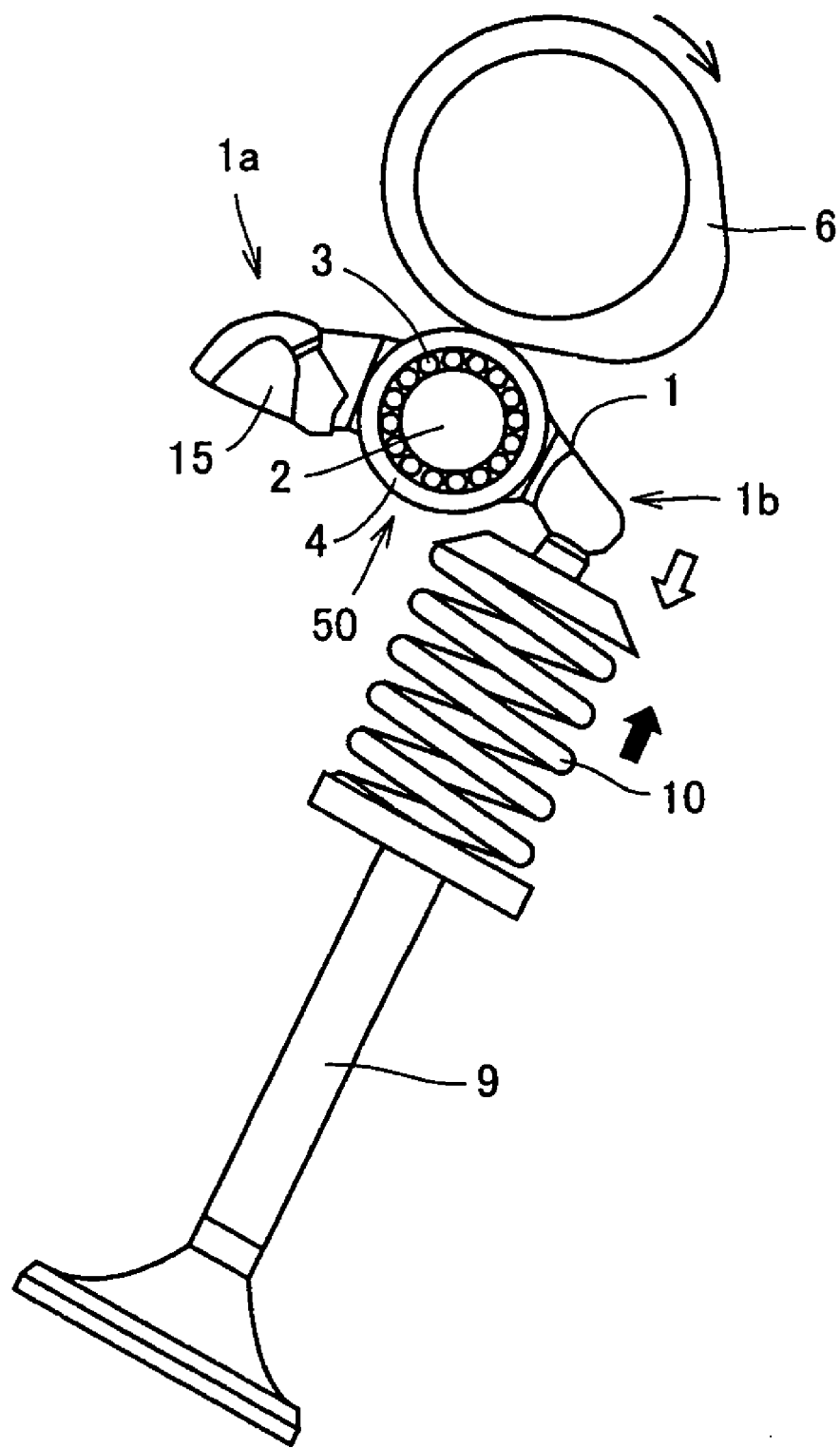
FIG. 3 shows a roller cam follower of an engine according to a modification of the embodiment of the present invention.

FIG. 3 shows a roller cam follower of an engine according to another embodiment of the present invention. A cam follower body 50 of this cam follower has a roller shaft 2 fixed in a roller hole (not shown) which is made between one end 1b and the other end 1a of a rocker arm 1 and extends between two sidewalls, and the one end abuts on an end of an open-close valve 9 of the engine while the other end abuts on a pivot (not shown). Cam follower body 50 having pivot hole 15 is biased about the pivot and in a predetermined direction by a spring 10, and receives a driving force transmitted from a cam 6 by an outer ring 4 and thereby moves valve 9 against the biasing force of the spring.

Figure 4:
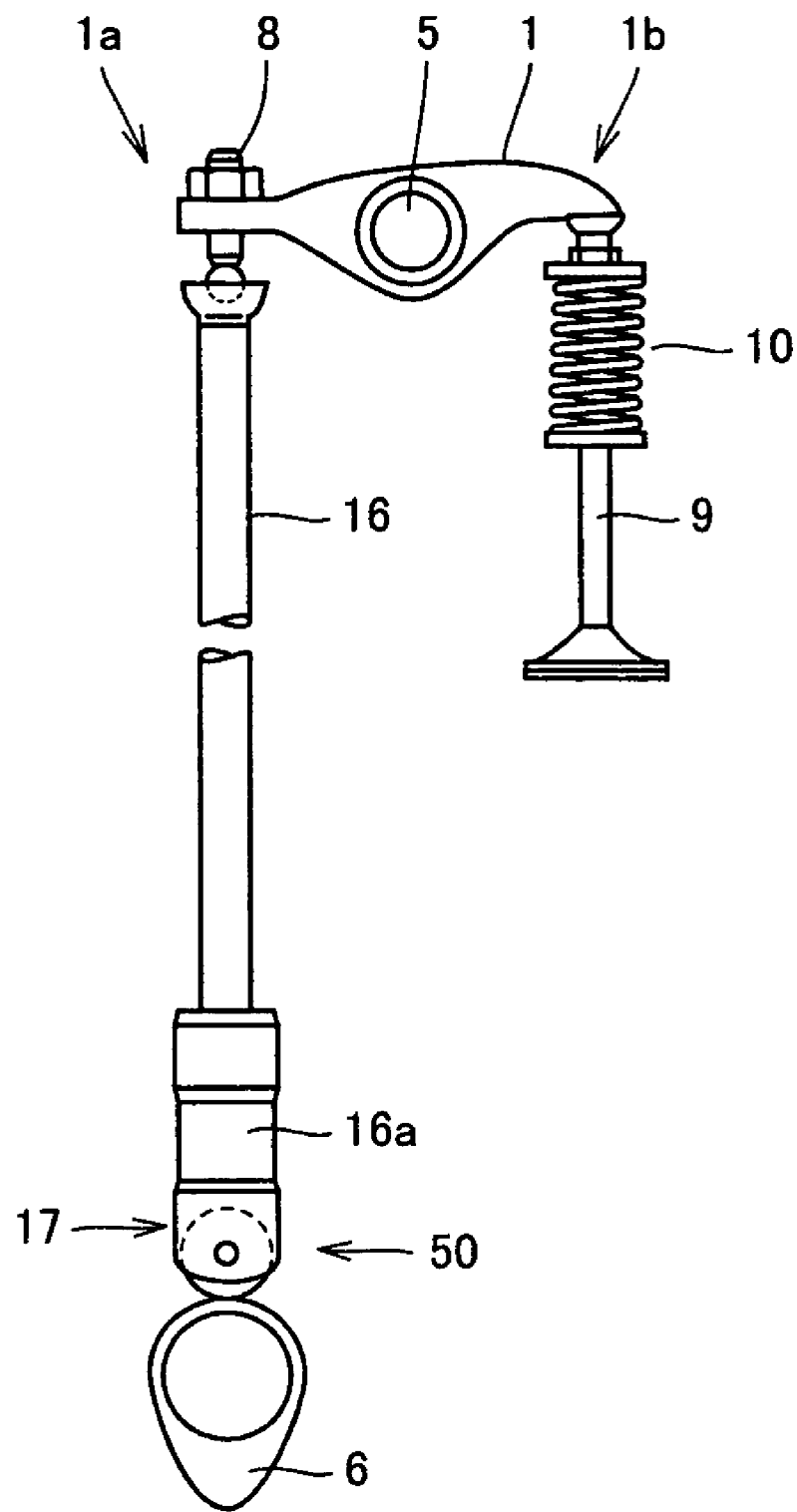
FIG. 4 shows a roller cam follower of an engine according to another embodiment of the present invention.
Figure 5:
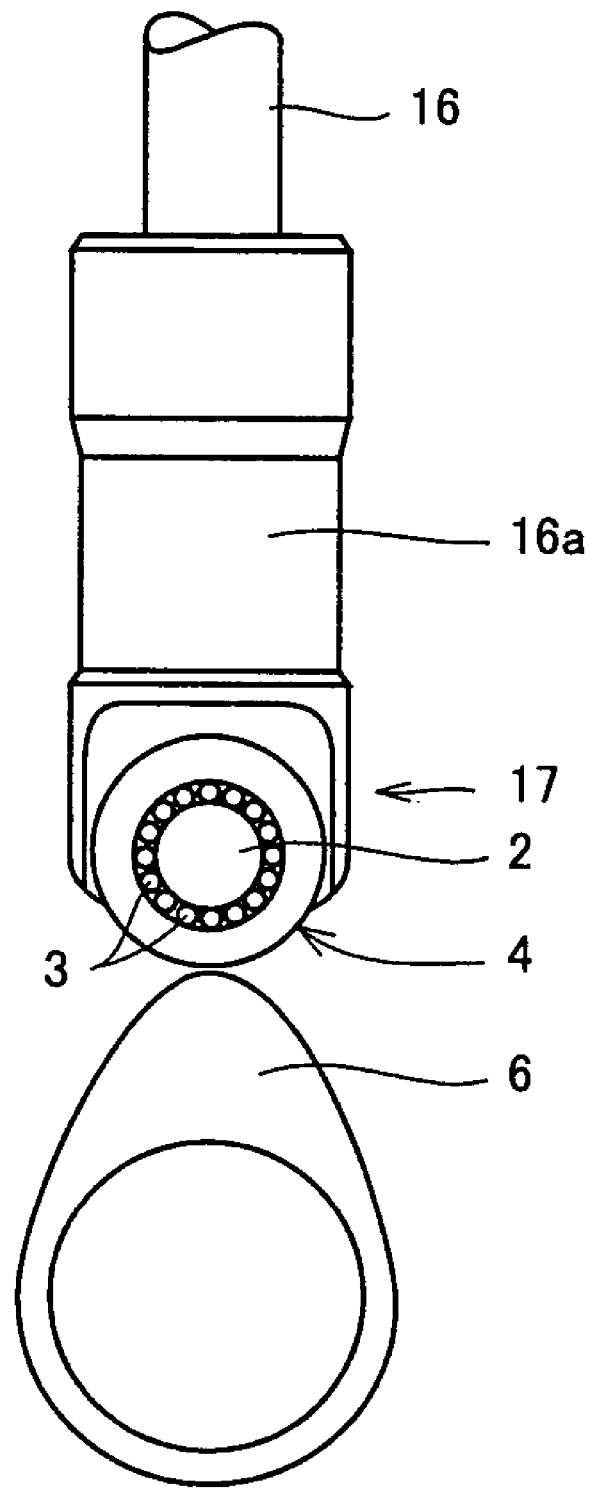
FIG. 5 is an enlarged view of a portion including a full roller bearing which is in contact with a cam of the roller cam follower of an engine shown in FIG. 4.

FIG. 4 shows a roller cam follower of an engine according to still another embodiment of the present invention. FIG. 5 is an enlarged view of a portion including a rocker arm rolling bearing shown in FIG. 4. Referring to FIG. 4, a rotational shaft 5 is placed at a central part of a rocker arm 1 and rocker arm 1 pivots about the shaft. One end 1b of rocker arm 1 abuts on an end of an engine valve 9 while the other end 1a of the arm abuts on an end of an interlocking rod 16. An adjust screw 8 has a function of adjusting the position at which the other end 1a of the rocker arm abuts on interlocking rod 16.

A cam follower body 50 is provided to a hollow bearing attachment 16a located on the lower end of interlocking rod 16, and a full roller bearing for the rocker arm is attached by an attachment member 17. A cam 6 abutting on an outer ring 4 transmits a driving force to the interlocking rod.

Of the components of the full roller bearing of the roller cam follower for the engine, at least one of rollers 3, roller shaft 2 and outer ring 4 is heat-treated through low-temperature secondary quenching so as to make austenite grains fine.

Figure 6:
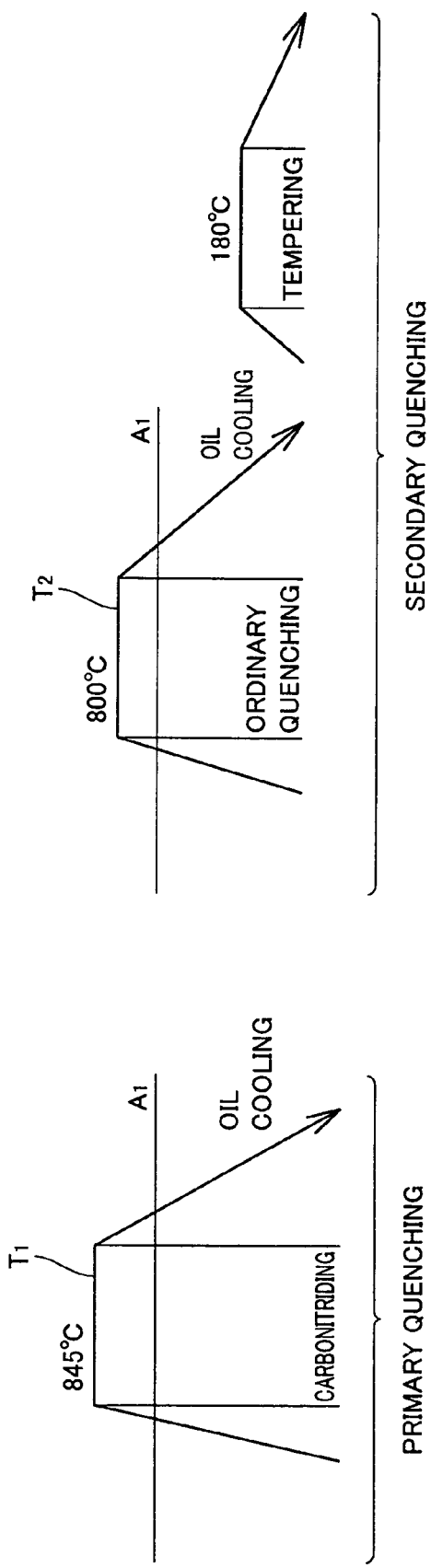
FIG. 6 shows a heat treatment method according to the embodiment of the present invention.
Figure 7:
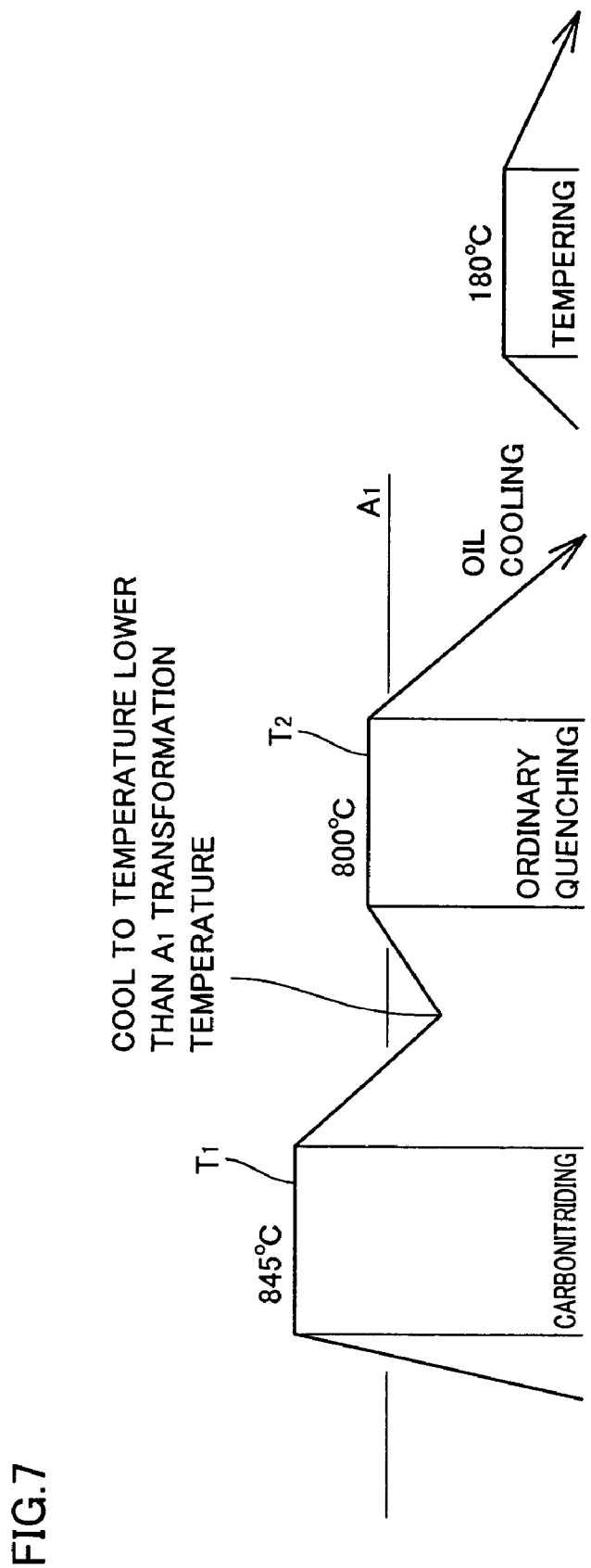
FIG. 7 shows a heat treatment method according to a modification of the embodiment.

A carbonitrided layer in which austenite crystal grains are made fine is preferably produced by a method for example described below, however, any method except for this may be used. FIG. 6 exemplarily shows a heat treatment method for producing a carbonitrided layer having fine austenite crystal grains therein according to the present invention, and FIG. 7 shows a modification thereof. Specifically, FIG. 6 shows a heat treatment pattern according to which primary quenching and secondary quenching are carried out, and FIG. 7 shows a heat treatment pattern according to which a material is cooled to a temperature lower than the A1 transformation temperature in a quenching process and thereafter heated again to be finally quenched. Referring to these drawings, in process T1, carbon and nitrogen are diffused through a steel matrix while the carbon is sufficiently dissolved therein, and thereafter cooling is done to a temperature below the A1 transformation temperature. Then, in process T2 shown in the drawings, heating is done again to a temperature lower than that in process T1 and then oil-quenching is performed. In process T1, a surface layer may be heated to a temperature in a range where austenite, carbide and/or nitride coexist. At a temperature in this coexistence region where austenite, carbide and/or nitride are present, austenite grains are fine and the concentration of carbon (nitrogen) in the austenite is relatively low. Therefore, even if quenching is conducted, a quenched structure which is sufficiently tough can be produced.

Compared with ordinary or normal quenching by which carbonitriding is done and immediately thereafter quenching is done once, the above-discussed heat treatment can improve the crack strength and prolong both of the surface damage life and the rolling fatigue life while carbonitriding the surface layer. Moreover, the issue of the decreased viscosity of the lubricating oil can be addressed. This heat treatment can also produce a microstructure having austenite crystal grains of a grain size which is smaller than the conventional one by one half or more. A bearing component undergoing this heat treatment has a long rolling fatigue life and a long surface damage life and can address the issue of decreased viscosity. The bearing component can also have an improved crack strength and a decreased rate of secular dimensional change.

Figure 8A:
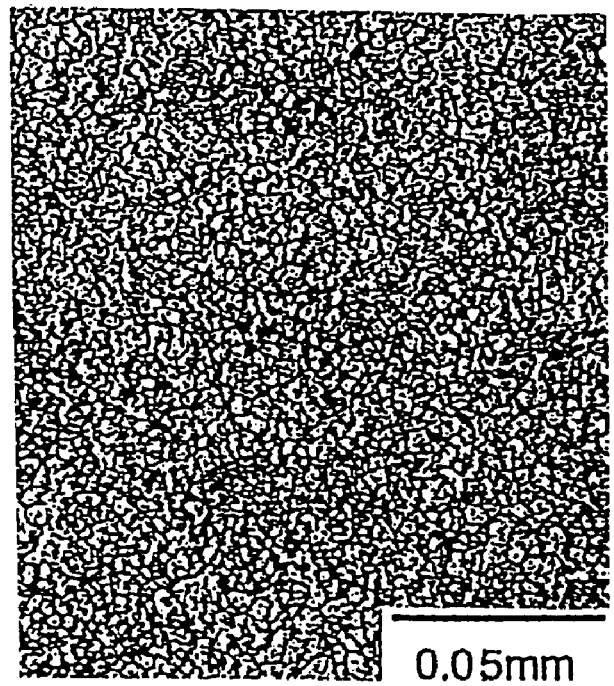
FIGS. 8A and 8B show a microstructure, particularly prior austenite grains, of a bearing component, FIG. 8A showing a bearing component of the present invention and FIG. 8B showing a conventional bearing component.
Figure 8B:
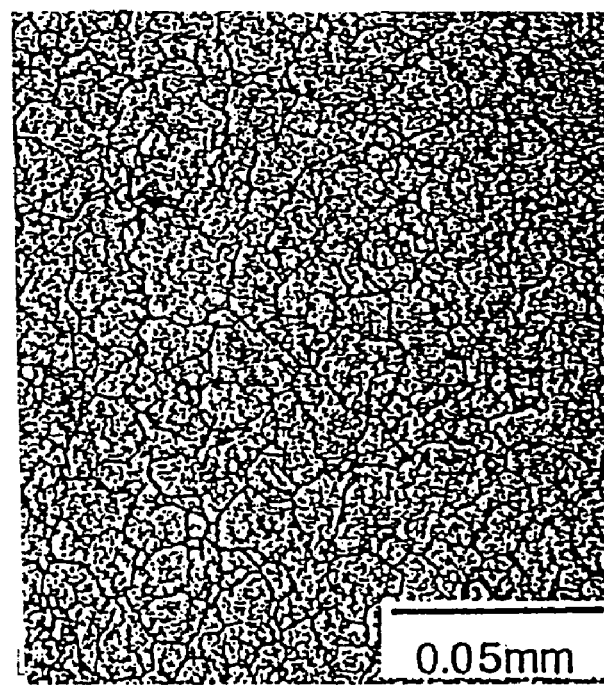
Figure 9A:
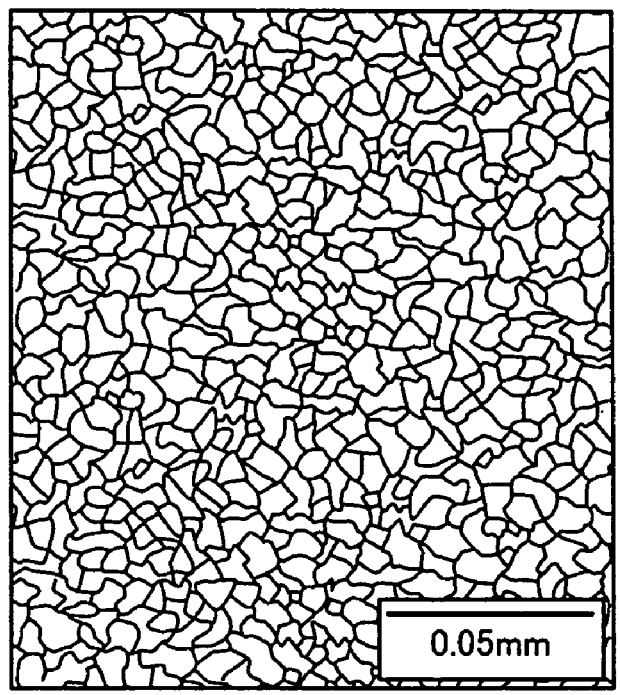
FIGS. 9A and 9B diagrammatically show austenite grain boundaries corresponding respectively to FIGS. 8A and 8B.
Figure 9B:
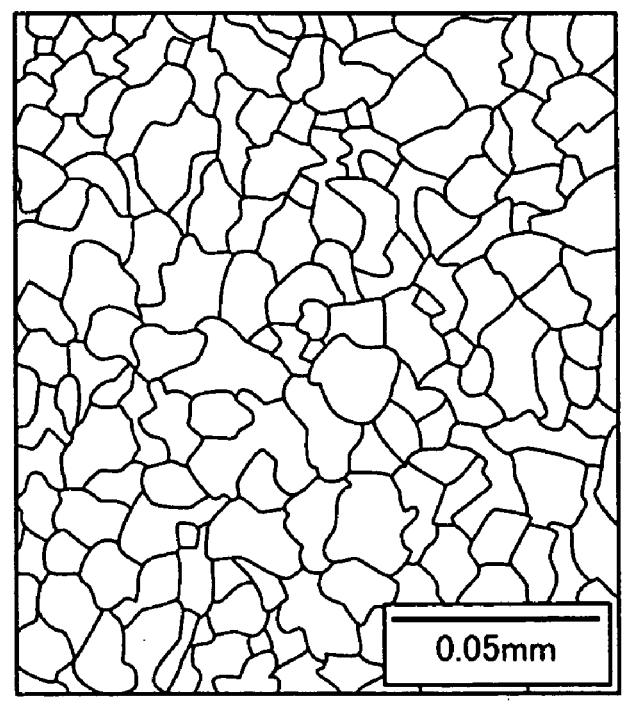

FIGS. 8A and 8B show a microstructure of a bearing component, particularly austenite grains. FIG. 8A shows a bearing component of the present invention and FIG. 8B shows a bearing component of a conventional bearing component. Namely, FIG. 8A shows a grain size of austenite of a bearing steel having been heat-treated as shown in FIG. 6. For comparison, FIG. 8B shows a grain size of austenite of a bearing steel which has undergone the conventional heat treatment. FIGS. 9A and 9B diagrammatically show the grain sizes of austenite that are shown in FIGS. 8A and 8B. In the structures with the crystal grain sizes of austenite, the grain diameter of the conventional austenite is 10 which is a grain size number defined by JIS while that of the present invention through the heat treatment thereof is 12 and thus fine grains are seen. Further, the average grain diameter in FIG. 8A is 5.6 μm measured by the intercept method. With a quenching temperature of 830° C., the average grain diameter is approximately 8 μm.

EXAMPLES

Example 1

Bearings of respective materials shown in Table 1 were prepared. These bearings were full-type needle bearings included in a roller cam follower of an engine. An inner ring (roller shaft) was 14.64 mm (outer diameter)×17.3 mm (width) in size and an outer ring was 18.64 mm (inner diameter)×24 mm (outer diameter)×6.9 mm (width) in size. 26 rollers each having a size of 2 mm (outer diameter)×6.8 mm (length) were used. The bearings were full-type bearings without cage. The bearings had a basic load rating of 8.6 kN and a basic static load rating of 12.9 kN. Here, basically the bearings were each a combination of the same materials, while some were each a combination of different materials and some were produced by being additionally processed. Table 1 shows a list of the prepared bearings.

TABLE 1

List of Test Samples

| No. | features | crystal grain size No. | surface layer hardness (HV) | compression residual stress (MPa) | 500° C. tempering hardness (HV) |
|---|---|---|---|---|---|
| example *1 | | | | | |
| 1 | bearing steel: heavy cold working + carbonitriding | 11 | 750 | 200 | 620 |
| 2 | bearing steel: carbonitriding + low-temperature secondary quenching | 12 | 770 | 150 | 580 |
| 3 | carburizing steel: carbonitriding + low-temperature secondary quenching | 11 | 770 | 350 | 650 |
| 4 | No. 1 + shot peening for inner and outer rings, barrel finishing for rollers | 11 | 820 | 650 | 610 |
| 5 | No. 2 + shot peening for inner and outer rings, barrel finishing for rollers | 12 | 800 | 600 | 590 |
| 6 | No. 3 + shot peening for inner and outer rings, barrel finishing for rollers | 11 | 800 | 700 | 640 |
| 7 | No. 1 + sub-zero treating | 11 | 850 | 100 | 610 |
| 8 | No. 7 + shot peening for inner and outer rings, barrel finishing for rollers | 11 | 890 | 650 | 610 |
| 9 | carbonitriding and low-temperature secondary quenching for inner ring and rollers, normal heat treatment for outer ring | outer ring: 9 others: 12 | outer ring: 740 others: 760 | outer ring: 0 others: 150 | outer ring: 470 others: 590 |
| 10 | carbonitriding and low-temperature secondary quenching of carburizing steel for inner and outer rings, carbonitriding for rollers | inner/outer rings: 11 rollers: 8 | inner/outer rings: 760 rollers: 780 | inner/outer rings: 350 rollers: 150 | inner/outer rings: 650 rollers: 590 |
| comparative example | | | | | |
| 11 | normal heat treatment of bearing steel for inner and outer rings and rollers | 10 | 740 | 0 | 470 |
| 12 | carbonitriding of bearing steel for inner and outer rings and rollers | 8–9 | 780 | 180 | 580 |
| 13 | normal carburizing of carburizing steel for inner and outer rings, normal heat treatment of bearing steel for rollers | inner/outer rings: 7 rollers: 10 | 730 | inner/outer rings: 400 rollers: 0 | inner/outer rings: 460 rollers: 470 |
| 14 | secondary quenching of carburizing steel | 10 | 750 | 200 | 470 |
| 15 | No. 11 + shot peening for inner and outer rings, barrel finishing for rollers | 10 | 800 | 500 | 470 |

*1 examples of the present invention

Samples shown in Table 1 are as follows.

No. 1: A bearing steel was subjected to heavy cold working in advance, heat-treated with crystal grains thereafter being made fine, and then carbonitrided.

No. 2: A bearing steel was carbonitrided and then secondary-quenched at a temperature lower than the carbonitriding temperature.

No. 3: A carburizing steel was carburized, carbonitrided and then secondary-quenched at a lower temperature. In other words, the low-temperature quenching was performed after the carburizing process.

The crystal grain size of austenite of samples Nos. 1–3 was at least No. 11. These materials were used as base samples. The following samples were prepared by additionally processing the base samples for producing a compression residual stress in the surface layer.

No. 4: The inner and outer rings of sample No. 1 were shot-peened and rollers were barrel-finished.

No. 5: The inner and outer rings of sample No. 2 were shot-peened and rollers were barrel-finished.

No. 6: The inner and outer rings of sample No. 3 were shot-peened and rollers were barrel-finished.

Samples with their surface hardness increased are as follows.

No. 7: The inner and outer rings of sample No. 1 were additionally sub-zero treated (−196° C.).

No. 8: The inner and outer rings of sample No. 1 were additionally sub-zero treated (−196° C.) and then shot-peened, and rollers were barrel-finished.

For the following samples, the above-described methods were applied to the inner and outer rings and rollers each, especially the inner ring and rollers for which the rolling life was significant.

No. 9: The inner ring and rollers were carbonitrided and then secondary-quenched at a temperature lower than the carbonitriding temperature, and the outer ring was subjected to a normal heat treatment.

No. 10: For inner and outer rings, a carburizing steel was carburized, carbonitrided, cooled, and then secondary-quenched at a lower temperature, and, for rollers, a bearing steel was carbonitrided.

As comparative examples, five samples No. 11–15 were prepared as shown in the lower part of Table 1.

No. 11: Inner and outer rings and rollers were made of a bearing steel which was normally heat-treated (normal sample).

No. 12: Inner and outer rings and rollers were made of a bearing steel which was carbonitrided.

No. 13: Inner and outer rings were made of a carburizing steel which was carburized and rollers were made of a bearing steel which was normally heat-treated.

No. 14: This sample was made of a carburizing steel which was secondary-quenched.

No. 15: Inner and outer rings of sample No. 11 were shot-peened and rollers thereof were barrel-finished.

For these samples, crystal grain size, hardness and hardness after 500° C.-tempering (index of heat resistance) were measured, resultant measurements being shown in Table 1.

Tests for evaluating rolling life and surface damage strength are detailed below.

Figure 10:
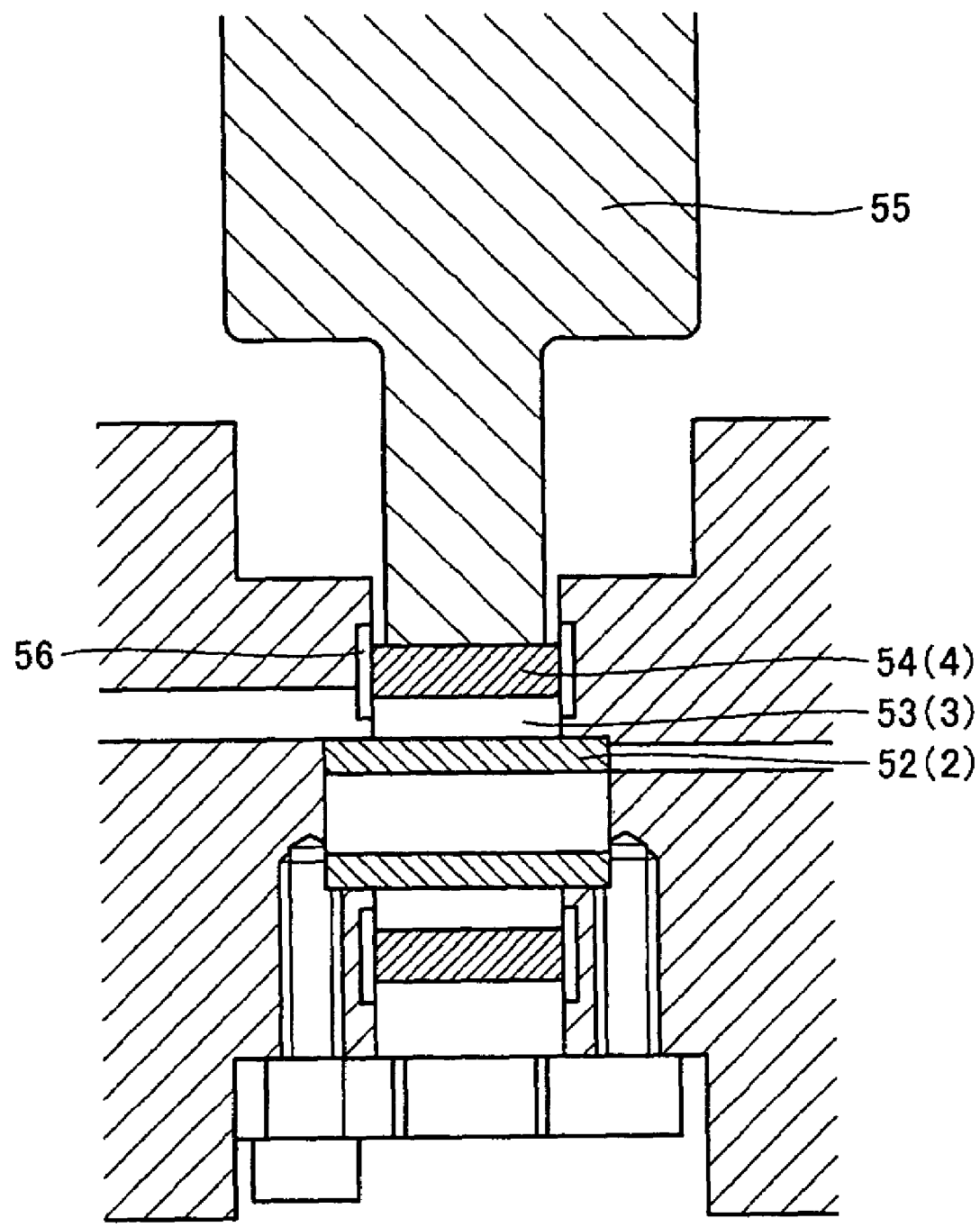
FIG. 10 schematically shows a rolling fatigue life tester for a rolling outer ring.

Evaluation of rolling life:

An outer ring (18.64 mm (inner diameter)×24 mm (outer diameter)×6.9 mm (width)), 26 rollers (2 mm (outer diameter)×6.8 mm (length)) and a roller shaft (14.64 mm (outer diameter)×17.3 mm (length)) were assembled and then subjected to a rolling fatigue test under a load of 2.58 kN. A test machine is shown in FIG. 10 and test conditions are shown in Table 2. This test was done for rotation of the outer ring. Referring to FIG. 10, a plurality of needle-shaped rollers 53 (3) were placed rollably between a roller shaft 52 (2) and an outer ring 54 (4) that were incorporated in a tester. This outer ring 54 was rotated at a predetermined speed under a radial load exerted thereon by members 55 and 56 to conduct a life test. Here, the test was done under the load which was 30% of the basic road rating of 8.6 kN. Results of the test are shown in Table 3.

TABLE 2

| Rolling Life Test Conditions for Bearing | |
|---|---|
| tester | life tester for outer ring rotation |
| test piece | rocker arm bearing assembly |
| load (N) | 2580 N (0.3 C) |
| outer ring rpm | 7000 rpm |
| lubricant | engine oil 10W-30 |
| oil temperature | 100° C. |
| life | peeling life |

TABLE 3

Test Results

| | No. | features | relative rolling life (L50) |
|---|---|---|---|
| example*1 | 1 | bearing steel: heavy cold working + carbonitriding | 3.0 |
| | 2 | bearing steel: carbonitriding + low-temperature secondary quenching | 3.5 |
| | 3 | carburizing steel: carbonitriding + low-temperature secondary quenching | 3.2 |
| | 4 | No. 1 + shot peening for inner and outer rings, barrel finishing for rollers | 4.1 |
| | 5 | No. 2 + shot peening for inner and outer rings, barrel finishing for rollers | 3.9 |
| | 6 | No. 3 + shot peening for inner and outer rings, barrel finishing for rollers | 4.3 |
| | 7 | No. 1 + sub-zero treating | 2.8 |
| | 8 | No. 7 + shot peening for inner and outer rings, barrel finishing for rollers | 3.5 |
| | 9 | carbonitriding and low-temperature secondary quenching for inner ring and rollers, normal heat treatment for outer ring | 2.8 |
| | 10 | carbonitriding and low-temperature secondary quenching of carburizing steel and bearing steel respectively for inner and outer rings and for rollers | 3.1 |

TABLE 3-continued

Test Results

| | No. | features | relative rolling life (L50) |
|---|---|---|---|
| comparative example | 11 | normal heat treatment of bearing steel for inner and outer rings and rollers | 1.0 |
| | 12 | carbonitriding of bearing steel for inner and outer rings and rollers | 1.9 |
| | 13 | normal carburizing of carburizing steel for inner and outer rings, normal heat treatment of bearing steel for rollers | 1.2 |
| | 14 | secondary quenching of carburizing steel | 1.4 |
| | 15 | No. 11 + shot peening for inner and outer rings, barrel finishing for rollers | 1.7 |

*1 examples of the present invention

Regarding the samples with the test results shown in Table 3, the peeling was mainly occurred on the rollers or the inner ring while the peeling was also occurred partially on the outer ring of sample No. 9. It is seen from Table 3 that the samples of the present invention exhibit a longer life as compared with the comparative examples and any samples of the present invention exhibit a lifetime which is approximately three times as long as that of the normally processed sample and approximately 1.5 times as long as the carbonitrided sample.

Peeling Test:

Table 4 shows a list of samples subjected to tests including a peeling test as well as results of the test, and Table 5 shows peeling-test conditions. Samples Nos. 1–3 of the present invention and samples of the present invention that were shot-peened or sub-zero treated ones of those samples were prepared. The samples of the present invention were 8 in total (No. 1–8) and five samples (No. 11–15) were prepared as comparative examples, and thus the number of samples was 13 in total that were subjected to the peeling test.

TABLE 4

Results of Strength Test for Outer Ring

| No. | features | peeling strength | relative peeling strength | relative crack strength | relative crack fatigue strength |
|---|---|---|---|---|---|
| example *1 | | | | | |
| 1 | bearing steel: heavy cold working + carbonitriding | 1.7 | 1.6 | 1.2 | 1.2 |
| 2 | bearing steel: carbonitriding + low-temperature secondary quenching | 1.8 | 1.7 | 1.1 | 1.2 |
| 3 | carburizing steel: carbonitriding + low-temperature secondary quenching | 1.5 | 1.5 | 1.0 | 1.3 |
| 4 | No. 1 + shot peening | 2.0 | 1.8 | 1.3 | 1.3 |
| 5 | No. 2 + shot peening | 2.1 | 1.9 | 1.2 | 1.3 |
| 6 | No. 3 + shot peening | 2.0 | 1.8 | 1.2 | 1.4 |
| 7 | No. 1 + sub-zero treating | 1.8 | 1.6 | 1.1 | 1.0 |
| 8 | No. 7 + shot peening | 2.0 | 1.8 | 1.3 | 1.2 |
| comparative example | | | | | |
| 11 | normal heat treatment of bearing steel | 1.0 | 1.0 | 1.0 | 1.0 |
| 12 | carbonitriding of bearing steel | 1.4 | 1.5 | 0.8 | 1.1 |

TABLE 4-continued

Results of Strength Test for Outer Ring

| No. | features | peeling strength | relative peeling strength | relative crack strength | relative crack fatigue strength |
|---|---|---|---|---|---|
| 13 | normal carburizing of carburizing steel | 0.8 | 0.9 | 0.7 | 1.2 |
| 14 | secondary quenching of carburizing steel | 1.1 | 1.1 | 0.9 | 1.1 |
| 15 | No. 11 + shot peening | 1.1 | 1.0 | 1.1 | 1.0 |

*1 examples of the present invention

TABLE 5

Peeling Test Conditions

| | |
|---|---|
| tester | ring to ring type tester |
| test piece | φ 40 straight, surface roughness (Rt) 0.2 μm |
| counterpart test piece | φ 40 × R60, surface roughness (Rt) 3.0 μm (made of SUJ2) |
| contact surface pressure | Pmax 2.3 GPa |
| lubricating oil | turbine oil VG46 |
| rotational speed of counterpart test piece | 2000 rpm (test piece rolls following rotation of counterpart test piece) |
| total load count | $4.8 \times 10^5$ times |

Test pieces (mirror-finished) having a diameter of 40 mm of respective 13 test samples were brought into rolling contact with a rough-surfaced counterpart test piece under constant conditions, and the ratio of an area where peelings (a collection of fine peelings) were observed on the (mirror-finished) test piece of a sample to the entire area was measured after a certain time. The reciprocal of the determined ratio of the area is herein defined as peeling strength, and the peeling strength of comparative example No. 1 which is the normal sample is indicated by 1 as a reference.

Test results are shown in Table 4. Any of the test pieces of the present invention has a peeling strength which is at least 1.5 times as high as that of comparative examples. It is observed that fine austenite grains with the grain size number greater than 10 enhance the toughness and thereby increase resistances against occurrence and subsequent growth of cracks. Moreover, samples (No. 4–8) with a compression residual stress provided through the sub-zero treatment and any processing are improved in terms of strength. This is because the high hardness and the compression residual stress effectively contribute to prevention of occurrence and growth of peeling cracks.

Smearing Test:

The same test pieces as those for the peeling test were used (see Table 4) to examine smearing strength. Test conditions are shown in Table 6. A test piece to be tested and a counterpart test piece were each made of a combination of the same materials.

TABLE 6

Smearing Test Conditions

| tester | ring to ring type tester |
|---|---|
| test piece | φ 40 × R60 surface roughness (Rt) 3.0 μm |
| counterpart test piece | φ 40 × R60 surface roughness (Rt) 3.0 μm |
| contact surface pressure | Pmax 2.1 GPa |
| lubricating oil | turbine oil VG46 |
| rotational speed of counterpart test piece | 200 rpm, acceleration of 100 rpm per 30 sec |
| rotational speed of test piece | 200 rpm |

Results are shown in Table 4. Here, the smearing strength was evaluated on the basis of the rotational speed of the counterpart test piece when smearing occurred, and the results are shown as a ratio with respect to the result of the normal sample (comparative example No. 11) which was used as a reference. With regard to smearing, it is also observed that the smearing strength (rotational speed before the smearing occurs) of the examples of the present invention is at least 1.5 times as high as that of the normal sample of the comparative example and is somewhat higher than the smearing strength of other comparative examples. The balance established between the fineness of the crystal grains with the grain size number of at least No. 11, an appropriate amount of retained austenite and the presence of fine carbide prevents plastic flow of the surface layer and accordingly improves the anti-seizure property. Samples that were additionally processed exhibit a slight improvement in strength compared with samples without being additionally processed.

Figure 11:
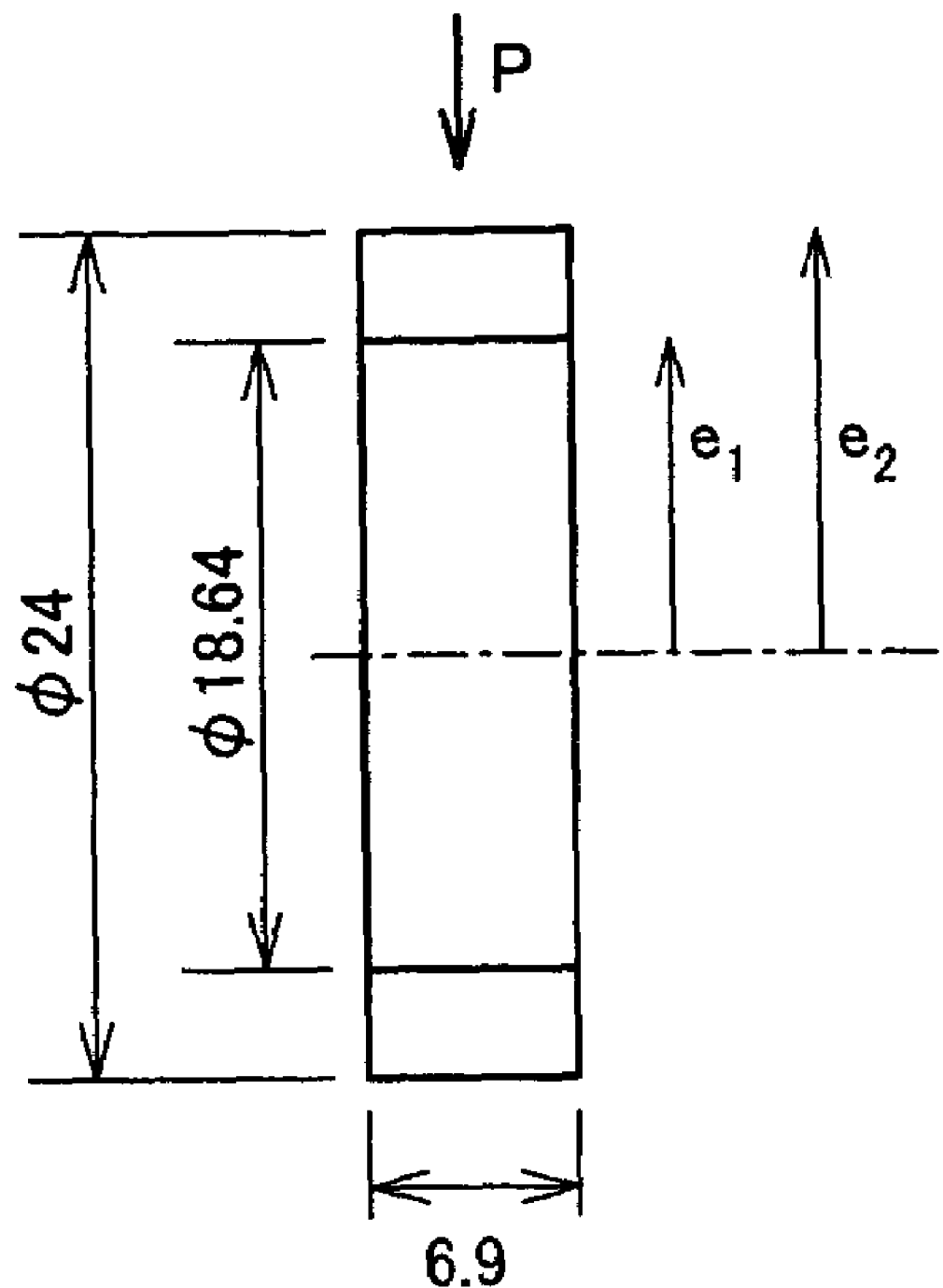
FIG. 11 shows a test piece for testing the static crack strength.

Static Crack Strength Test:

For test samples shown in Table 4, crack strength was measured by imposing a load by an Amsler's testing machine on only an outer ring (18.64 mm (inner diameter)×24 mm (outer diameter)×6.9 mm (width)) in the shape as shown in FIG. 11. Results are shown in Table 4. Origins of cracks were on the inner surface of the ring (rolling contact surface). Table 4 shows that the carbonitriding usually deteriorates the static crack strength as seen from comparative example No. 12. In contrast, the static strength of examples Nos. 1–3 of the present invention is equal to or somewhat higher than that of the normal sample undergoing the normal heat treatment and the examples of the present invention do not show deterioration in static crack strength. Examples Nos. 4–6 of the present invention that are additionally processed as compared with examples Nos. 1–3 are all enhanced in crack strength. Example No. 7 of the present invention undergoing sub-zero treatment is slightly lower in static crack strength than example No. 1 without being sub-zero treated, and is slightly higher in static crack strength than example No. 8 which is additionally processed as compared with example No. 7.

It is considered that a reason for the deterioration of the strength of comparative example No. 12 is an increased crystal grain size of austenite and an increased amount of retained austenite resulting from a long-term heating in the diffusion process of the carbonitriding so that a structure having a low tensile strength is locally formed. Comparative example No. 13 also deteriorates in strength for the same reason.

Crack Fatigue Strength Test:

Crack fatigue strength was determined by repeatedly imposing a load under conditions shown in Table 7 on an outer ring of the test samples shown in FIG. 4. Specifically, a load in the range from 98 N (lower limit) to 3000–5000 N (upper limit) was repeatedly exerted on the outer ring and the number of repetitions before cracks occurred was used for evaluation of the strength. Here, an S—N curve was plotted with the load condition changed, and the strength was evaluated based on a load which could be exerted $10^5$ times before cracks occurred.

TABLE 7

Ring Crack Fatigue Test Conditions

| tester | hydraulic servo type vibrator |
|---|---|
| test piece | φ 18.64 × φ 24 × L6.9 |
| load (N) | changing in the range of 3000–5000 |
| load frequency (Hz) | 20–50 (changing depending on load) |
| evaluation | strength at $10^5$ times on S/N curve |

Results are shown in Table 4. The results of the crack fatigue strength test are represented as a ratio of the strength to the strength of the normal heat-treated sample of the comparative example. It is seen that all examples of the present invention are remarkably improved in crack fatigue strength as compared with comparative examples. Regarding the crack fatigue strength, example No. 3 of the present invention having the carburizing steel as the base component and example No. 6 of the present invention with the carburizing steel as the base component to which the compression residual stress is added are superior in strength.

Figure 12:
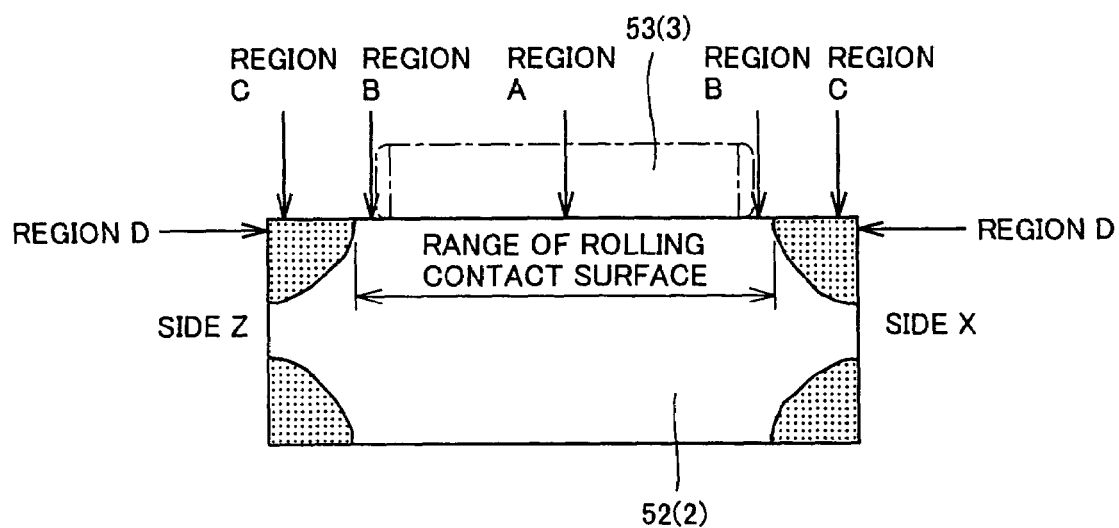
FIG. 12 shows a hardness distribution when two ends of a roller shaft are softened by high-frequency heating.

Softening of the Ends of the Roller Shaft:

The two end surfaces of the roller shaft are high-frequency annealed by bringing only one end of the roller shaft material, which has already been appropriately processed, close to an opening at the end of a high-frequency coil or maintaining the one end in a slightly inserted state in the opening, heating the end for a considerably short period of time by high-frequency induction current and then cooling in the air. Alternatively, after the high-frequency heating and the above-mentioned short-term cooling, rapid cooling may be done by pouring water onto the surface or putting the material into water. A resultant hardness distribution is shown in FIG. 12 and Table 8.

TABLE 8

Hardness S after High-Frequency Annealing of Roller Shaft

| | region A | region B | region C | region D |
|---|---|---|---|---|
| side Z | 750 | 700 | 250 | 230 |
| side X | | 700 | 250 | 230 |

As shown in FIG. 12 and Table 8, the central part represented by region A where the rolling elements pass and its ends represented by regions B have appropriately high hardness. On the other hand, regions C and D on the ends of the outer surface that are important in caulking process ensure appropriately lower hardness (softness) necessary for the caulking.

It can accordingly be confirmed from the above results that the durability is improved of the rolling bearing for the rocker arm that is likely to have a short life due to adverse sliding conditions, skew of rollers and interference of rollers with each other. The improvement of the durability is achieved by processing the material into the one having fine crystal grains and heat resistance and thereby simultaneously improving the surface damage (such surface-initiated exfoliation as peeling and smearing) life as well as the inside-initiated peeling life. Specifically, specific processing of the material or heat treatment pattern is employed to produce a carbonitrided structure which has at least a certain crystal grain size of austenite, which provides remarkably increased resistance against occurrence and growth of cracks. In this way, occurrence of surface cracks can be prevented that is caused by heat generation from the surface layer and tangential stress due to sliding, and a considerably long life can further be achieved against peeling initiated from the internal part. On the basis of this, processing and heat treatment are additionally done to provide a compression residual stress to the surface layer and increase the hardness, so as to further increase the life. These heat treatment and processing include shot peening, barrel finishing, rolling, varnishing, carburizing & carbonitriding, carbonitriding & sub-zero treatment, carbonitriding, secondary quenching & sub-zero treatment, for example.

In a case where caulking is done, for the roller shaft serving as the inner ring which is an element of the bearing, both of the outer surface on the end of the roller shaft as well as the outer region of the end surface are required to be soft enough to plastically deform in the caulking process. On the other hand, the ends of the roller shaft are required to have certain hardness or higher since the roller shaft which is caulked to be fixed to a roller supporting portion could loosen in long-term use of the cam follower, resulting in dropping off from the shaft hole. For the roller shaft having properties added by the above heat treatment and processing, heating and cooling conditions in the high-frequency annealing are adjusted for only the two ends of the roller shaft in order to adjust the hardness of the end surfaces. Then, the roller shaft which can be caulked and is excellent in durability is achieved. In other words, different from the conventional carbonitriding, the above-discussed heat treatment and processing do not deteriorate the crack strength and thus a high-strength and long-life full rolling bearing can be produced. Moreover, the high-frequency annealing is performed on both ends of the roller shaft which is an element of the bearing to adjust the hardness and thereby allow the ends to be caulked.

Accordingly, for a bearing of a rocker arm employed for opening/closing of an intake valve or exhaust valve of an auto engine, for example, a small full-type bearing having a width ranging from 5 mm to 12 mm, the durability of the bearing can be increased while caulking thereof can be done.

Example 2

JIS-SUJ2 (1.0 wt % of C—0.25 wt % of Si—0.4 wt % of Mn—1.5 wt % of Cr) was used for Example 2 of the present invention. Samples shown in Table 9 were each produced through the procedure described below.

TABLE 9

| sample | A | B | C | D | E | F | conventional carbonitrided sample | normal quenched sample |
|---|---|---|---|---|---|---|---|---|
| secondary quenching temperature (° C.) | 780[1] | 800 | 815 | 830 | 850 | 870 | — | — |
| hydrogen amount (ppm) | — | 0.37 | 0.40 | 0.38 | 0.42 | 0.40 | 0.72 | 0.38 |
| crystal grain size (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| fracture stress (MPa) | — | 2840 | 2780 | 2650 | 2650 | 2700 | 2330 | 2770 |
| relative rolling fatigue life ($L_{10}$) | — | 5.4 | 4.2 | 3.5 | 2.9 | 2.8 | 3.1 | 1 |

[1] evaluation failed due to insufficient quenching

Samples A–D: Examples of the Present Invention

Carbonitriding was performed at 850° C. held for 150 minutes in an atmosphere of a mixture of RX gas and ammonia gas. Following the heat treatment pattern shown in FIG. 6, primary quenching was done from a carbonitriding temperature of 850° C., and secondary quenching was subsequently done by heating to a temperature in a temperature range from 780° C. to 830° C. lower than the carbonitriding temperature. Sample A with a secondary quenching temperature of 780° C. was not tested since quenching of sample A was insufficient.

Samples E and F: Comparative Examples

These samples were carbonitrided through the same procedure as that of samples A–D of the present invention, and then secondary quenched at a temperature from 850° C. to 870° C. equal to or higher than the carbonitriding temperature of 850° C.

Conventional Carbonitrided Sample: Comparative Example

Carbonitriding was performed at 850° C. held for 150 minutes in an atmosphere of a mixture of RX gas and ammonia gas. Quenching was successively done from the carbonitriding temperature and no secondary quenching was done.

Normal Quenched Sample: Comparative Example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress and (5) rolling fatigue test, by the methods described below.

I. Test Methods for Example 2

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows.

Analysis range: 0.01–50.00 ppm
Analysis precision: 0.1 ppm or +3% H (higher one)
Analysis sensitivity: 0.01 ppm
Detection method: thermal conductimetry
Sample weight size: 10 mg–35 g (max: 12 mm (diameter)× 100 mm (length))
Furnace temperature range: 50° C.–1100° C.
Reagent: anhydron $Mg(ClO_4)_2$, Ascarite and NaOH
Carrier gas: nitrogen gas
Dosing gas: hydrogen gas
(Both gases have a purity of at least 99.99% and a pressure of 40 PSI (2.8 $kgf/cm^2$).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector. The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202.

(4) Measurement of Fracture Stress

Figure 13:
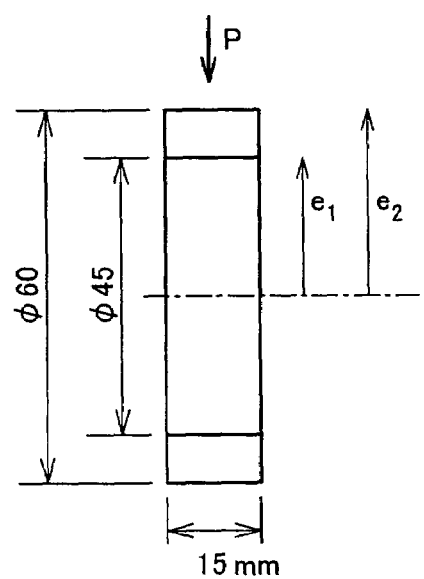
FIG. 13 shows a test piece for testing static-pressure fracture-strength (measuring fracture stress).

FIG. 13 shows a test piece for a static-pressure fracture-strength test (for measuring fracture stress). A load was exerted in direction P in FIG. 13 and the load when the test piece was fractured was measured. Then, the measured load which was a fracture load was converted into a stress by the following stress calculation formula for a curved beam. It is noted that the test piece to be used is not limited to the one shown in FIG. 13 and may be any test piece having a different shape.

Suppose that a fiber stress on the convex surface of the test piece shown in FIG. 13 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4–40). Here, N indicates an axial force of a cross section including the axis of the annular test piece, A indicates a cross-sectional area, $e_2$ indicates an outer radius, $e_2$ indicates an inner radius, and $\kappa$ is a section modulus of the curbed beam.

$$\sigma_1 = (N/A) + \{M/(A\rho_o)\}[1 + e_1/\{\kappa(\rho_o + e_1)\}]$$

$$\sigma_2 = (N/A) + \{M/(A\rho_o)\}[1 - e_2/\{\kappa(\rho_o - e_2)\}]$$

$$\kappa = -(1/A)\int_A \{\eta\} dA$$

(5) Rolling Fatigue Test

Figure 14A:
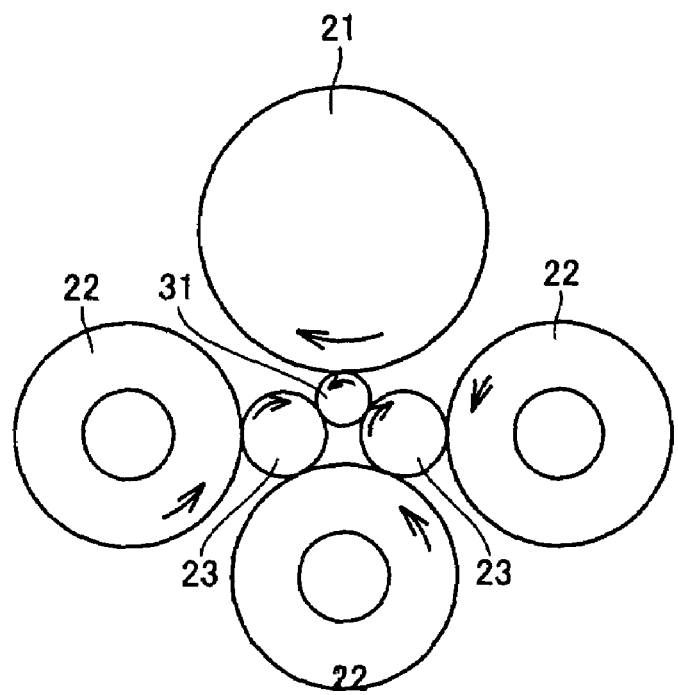
FIG. 14A is a front view of a rolling fatigue life tester and FIG. 14B is a side view thereof.
Figure 14B:
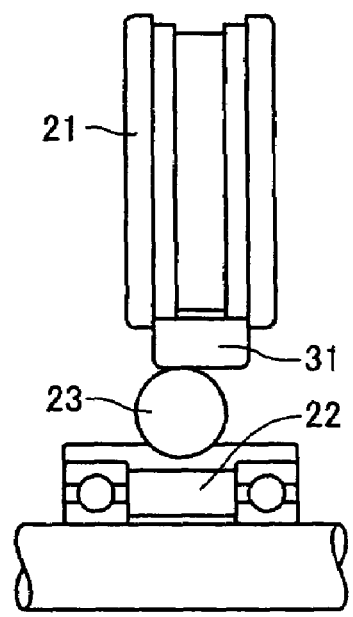

Test conditions for a rolling fatigue life test are shown in Table 10. FIGS. 14A and 14B schematically show a rolling fatigue life tester, FIG. 14A being a cross-sectional view and FIG. 14B being a side view thereof. Referring to FIGS. 14A and 14B, a test piece 31 undergoing the rolling fatigue life test was driven by a driving roll 21 to rotate while being in contact with balls 23. Balls 23 were (¾)" balls guided by guiding balls to roll. Balls 23 exerted a high surface pressure on test piece 31 while test piece 31 also exerted a high surface pressure on balls 23.

II. Results of Tests for Example 2

(1) Amount of Hydrogen

The conventional carbonitrided sample without being additionally processed has a considerably large hydrogen amount of 0.72 ppm. A reason therefor is considered that ammonia ($NH_3$) contained in the atmosphere in the carbonitriding process is decomposed and then hydrogen enters the steel. On the other hand, the hydrogen amount of samples B–D is reduced to 0.37–0.40 ppm and thus almost a half of that of the conventional sample. This amount of hydrogen is substantially equal to that of the normal quenched sample.

The above-mentioned reduction of the hydrogen amount can lessen the degree of embrittlement of the steel that is due to hydrogen in the solid solution. In other words, by the reduction of the hydrogen amount, the Charpy impact value of samples B–D of the present invention is remarkably improved.

(2) Crystal Grain Size

Regarding the crystal grain size, samples that are secondary quenched at a temperature lower than the quenching temperature in the carbonitriding process (primary quenching), namely samples B–D have austenite grains which are remarkably made fine, i.e., crystal grain size number is 11–12. Samples E and F as well as the conventional carbonitrided sample and the normal quenched sample have austenite grains with the crystal grain size number of 10, which means that the crystal grain size of samples E and F is greater than that of samples B–D of the present invention.

(3) Charpy Impact Test

Table 9 shows that the Charpy impact value of the conventional carbonitrided sample is 5.33 $J/cm^2$ while that of samples B–D of the present invention is higher, ranging from 6.30 to 6.65 $J/cm^2$. It is also seen from this that a lower secondary quenching temperature leads to a higher Charpy impact value. The normal quenched sample has a high Charpy impact value of 6.70 $J/Cm^2$.

(4) Measurement of Fracture Stress

The fracture stress corresponds to anti-crack strength. It is seen from Table 9 that the fracture stress of the conventional carbonitrided sample is 2330 MPa. On the other hand, the fracture stress of samples B–D is improved to 2650–2840 MPa. The normal quenched sample has a fracture stress of 2770 MPa which is in the range of the fracture stress of samples B–F. It is considered that the reduction in hydrogen content greatly contributes to the improved anti-crack strength of samples B–D as well as the reduction in size of austenite crystal grains.

(5) Rolling Fatigue Test

According to Table 9, the normal quenched sample has the shortest rolling fatigue life (L10) due to the absence of carbonitrided layer in the surface layer. In contrast, the rolling fatigue life of the conventional carbonitrided sample is 3.1 times as long as that of the normal quenched sample. The rolling fatigue life of samples B–D is remarkably improved as compared with the conventional carbonitrided sample. Samples E and F of the present invention have the rolling fatigue life almost equal to that of the conventional carbonitrided sample.

In summary, samples B–D of the present invention have the lower hydrogen content, finer austenite crystal grains with the crystal grain size number of at least 11, and improved Charpy impact value, anti-crack strength and rolling fatigue life.

Example 3

Example 3 of the present invention is now described. On the following samples A, B and C, a series of tests was conducted. A material to be heat-treated that was employed commonly to samples A–C was JIS-SUJ2 (1.0 wt % of C-0.25 wt % of Si-0.4 wt % of Mn-1.5 wt % of Cr). Samples A–C were each processed through the following procedure.

Sample A—comparative example: normal quenching only (without carbonitriding)

Sample B—comparative example: quenching directly after carbonitriding (conventional carbonitriding and quenching) Carbonitriding was conducted at 845° C. held for 150 minutes. The atmosphere in the carbonitriding process was a mixture of RX gas and ammonia gas.

Sample C—example of the present invention: A bearing material was processed following the heat treatment pattern shown in FIG. 6. Carbonitriding was conducted at 845° C. held for 150 minutes. The atmosphere in the carbonitriding process was a mixture of RX gas and ammonia gas. Final quenching temperature was 800° C.

(1) Rolling Fatigue Life

Test conditions and the test device for the rolling fatigue life test are as shown in Table 10 and FIGS. 14A and 14B. Results of the rolling fatigue life test are shown in Table 11.

TABLE 10

| test piece | φ 12 × L22 cylindrical test piece |
|---|---|
| number of tested pieces | 10 |
| counterpart steel ball | 3/4" (19.05 mm) |
| contact surface pressure | 5.88 GPa |
| load speed | 46240 cpm |
| lubricating oil | turbine VG68 - forced circulation lubrication |

TABLE 11

| | life (load count) | | |
|---|---|---|---|
| sample | $L_{10}$ (×10$^4$ times) | $L_{10}$ (×10$^4$ times) | relative $L_{10}$ |
| A | 8017 | 18648 | 1.0 |
| B | 24656 | 33974 | 3.1 |
| C | 43244 | 69031 | 5.4 |

According to Table 11, sample B which is a comparative example has a rolling fatigue life (L10 life: one out of ten test pieces being damaged) that is 3.1 times as long as that of sample A which is also a comparative example and undergoes normal quenching only, and thus it is seen that the effect of extending the life is obtained through the carbonitriding process. In contrast, sample C of the present invention has a longer life which is 1.74 times as long as that of sample B and 5.4 times as long as that of sample A. It is considered that this improvement is obtained mainly from the fine microstructure.

(2) Charpy Impact Test

A Charpy impact test was conducted by using a U-notch test piece defined by JIS Z 2242 mentioned above. Test results are shown in Table 12.

TABLE 12

| sample | Charpy impact value (J/cm$^2$) | relative impact value |
|---|---|---|
| A | 6.7 | 1.0 |
| B | 5.3 | 0.8 |
| C | 6.7 | 1.0 |

Sample B (comparative example) having undergone carbonitriding has a Charpy impact value which is not larger than that of sample A (comparative example) having undergone normal quenching, while sample C has a Charpy impact value equivalent to that of sample A.

(3) Static Fracture Toughness Test

Figure 15:
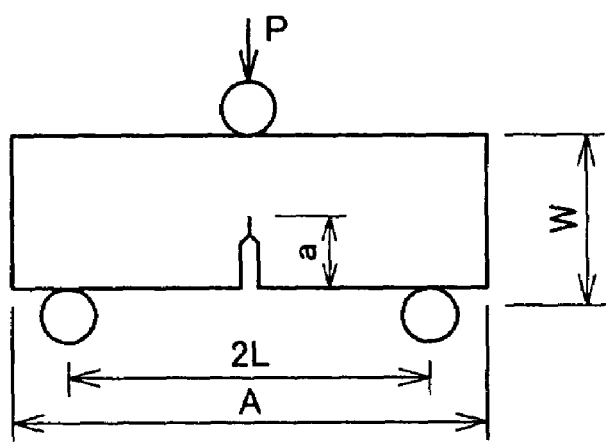
FIG. 15 shows a test piece for testing static fracture toughness.

FIG. 15 shows a test piece for a static fracture toughness test. In the notch of the test piece, a pre-crack of approximately 1 mm was made, thereafter a static load by three-point bending was added, and then a fracture load P was determined. Using the following formula (I), a fracture toughness value (KIc value) was calculated. Results of the test are shown in Table 13.

$$KIc=(PL\sqrt{a}/BW^2)\{5.8-9.2(a/W)+43.6(a/W)^2-75.3(a/W)^3+77.5(a/W)^4\}\ldots \quad (I)$$

TABLE 13

| sample | number tested | $K_1C$ (MPa$\sqrt{m}$) | relative $K_1C$ |
|---|---|---|---|
| A | 3 | 16.3 | 1.0 |
| B | 3 | 16.1 | 1.0 |
| C | 3 | 18.9 | 1.2 |

As the pre-crack has a depth greater than the depth of the carbonitrided layer and thus the same results are obtained for samples A and B (comparative examples), while the result for sample C (example of the present invention) is approximately 1.2 times as high as that of the comparative examples.

(4) Static-Pressure Fracture-Strength Test (Measurement of Fracture Stress)

A static-pressure fracture-strength test piece as shown in FIG. 13 described above was used. A load was exerted in direction P in FIG. 13 to conduct a static-pressure fracture-strength test. Test results are shown in Table 14.

TABLE 14

| sample | number tested | static fracture strength (kgf) | relative static fracture strength |
|---|---|---|---|
| A | 3 | 4200 | 1.00 |
| B | 3 | 3500 | 0.84 |
| C | 3 | 4300 | 1.03 |

Sample B having been carbonitrided has a strength somewhat smaller than that of sample A having undergone normal quenching, while sample C of the present invention has an improved static-pressure fracture-strength compared with sample B and is thus equivalent to that of sample A.

(5) Rate of Secular Dimensional Change

Table 15 shows the rate of secular dimensional change measured under the conditions of 130° C. (holding temperature) and 500 hours (holding time), together with the surface hardness and the amount of retained austenite (0.1 mm depth).

TABLE 15

| sample | number tested | surface hardness (HRC) | retained γ (%) | rate of dimensional change (×10$^{-5}$) | relative rate of dimensional change*) |
|---|---|---|---|---|---|
| A | 3 | 62.5 | 9.0 | 18 | 1.0 |
| B | 3 | 63.6 | 28.0 | 35 | 1.9 |
| C | 3 | 60.0 | 11.3 | 22 | 1.2 |

*)smaller is superior

As compared with the rate of dimensional change of sample B having a large amount of retained austenite, sample C of the present invention has the smaller rate of dimensional change due to the lower amount of retained austenite which is one-half or less.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 16 and test results are shown in Table 17.

TABLE 16

| load | Fr = 6.86 kN |
|---|---|
| contact surface pressure | Pmax = 3.2 Gpa |
| rotational speed | 2000 rpm |
| lubricant | turbine 56 - oil bath lubrication |
| amount of contaminant | 0.4 g/1000 cc |
| contaminant | grain size: 100–180 μm, hardness: Hv800 |

TABLE 17

| sample | $L_{10}$ life__(h) | relative $L_{10}$ |
|---|---|---|
| A | 20.0 | 1.0 |
| B | 50.2 | 2.5 |
| C | 45.8 | 2.3 |

Sample B having undergone conventional carbonitriding has a lifetime which is approximately 2.5 times as long as that of sample A, and sample C of the present invention has a lifetime which is approximately 2.3 times as long as that of sample A. While sample C of the present invention has a smaller amount of retained austenite than that of sample B of the comparative example, sample C has a long lifetime substantially equivalent to that of sample B because of influences of entering nitrogen and the fine microstructure.

It is accordingly seen from the above-discussed results that, sample C of the present invention, namely a bearing component produced by the heat treatment method of the present invention can simultaneously achieve three goals: extension of the rolling fatigue life that has been difficult to achieve by the conventional carbonitriding, improvement in crack strength and reduction of the rate of secular dimensional change.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A full-type rolling bearing formed of an outer ring, an inner ring and rollers that are made of steel, wherein
at least one of said outer ring, inner ring and rollers contains a non-diffusible hydrogen content of at most 0.5 ppm, carbon in an amount of 0.95% to 1.10%, silicon in an amount of 0.15% to 0.35%, manganese in an amount of at most 0.5%, phosphorous in an amount of at most 0.025%, sulfur in an amount of at most 0.025%, chromium in an amount of 1.30% to 1.60%, and molybdenum in an amount of less than 0.08%, with the remainder formed of Fe and unavoidable impurities, has a carbonitrided layer in its surface layer, and the austenite crystal grain size number of the surface layer is greater than 10, wherein
after at least one of said outer ring, inner ring and rollers is carbonitrided at a carbonitriding temperature equal to or higher than the A1 transformation temperature, said at least one of said outer ring, inner ring and rollers is cooled to a temperature lower than the A1 transformation temperature and then heated to a quenching temperature of 790° C.–815° C. and thereby quenched.

2. The full-type rolling bearing according claim 1, wherein said quenching temperature is in a temperature range at which carbide and/or nitride and an austenite phase coexist in the carbonitrided surface layer of the steel.

3. The full-type rolling bearing according to claim 1, wherein at least one of said outer ring, inner ring and rollers is cold-worked before being carbonitrided.

4. The full type rolling bearing according to claim 1, wherein in at least one of said outer ring, inner ring and rollers, a compression residual stress of at least 500 MPa is generated.

5. The full-type rolling bearing according to claim 1, wherein said austenite crystal grain size number is at least 11.

6. A roller cam follower of an engine comprising:
an outer ring being in rolling contact with a cam shaft of the engine;
a roller shaft located inside said outer ring and fixed to a cam follower body; and
bearing elements placed between said outer ring and said roller shaft, wherein
at least one of said outer ring, roller shaft and bearing elements contains a non-diffusible hydrogen content of at most 0.5 ppm, carbon in an amount of 0.95% to 1.10%, silicon in an amount of 0.15% to 0.35%, manganese in an amount of at most 0.5%, phosphorous in an amount of at most 0.025%, sulfur in an amount of at most 0.025%, chromium in an amount of 1.30% to 1.60%, and molybdenum in an amount of less than 0.08%, with the remainder formed of Fe and unavoidable impurities, has a carbonitrided layer, and austenite crystal grains in at least a surface layer are made fine to have a grain size number greater than 10, wherein
after at least one of said outer ring, roller shaft, and bearing elements is carbonitrided at a carbonitriding temperature equal to or higher than the A1 transformation temperature, said at least one of said outer ring, roller shaft and bearing elements is cooled to a temperature lower than the A1 transformation temperature and then heated to a quenching temperature of 790° C.–815° C. and thereby quenched.

7. The roller cam follower of an engine according to claim 6, wherein
said cam follower body is mounted on one end of a rocker arm, said rocker arm is pivotably attached to a rotational shaft located between said one end and the other end, one end of an open/close valve of said engine abuts on said other end, said cam follower body on said one end has a bifurcated roller supporting portion, and said roller shaft is fixed to said bifurcated roller supporting portion.

8. The roller cam follower of an engine according to claim 6, wherein
said cam follower body is mounted between one end and the other end of a rocker arm, said roller shaft is fixed in a roller hole extending between two sidewalls of the rocker arm, an end of an open/close valve of said engine abuts on said one end of said rocker arm, and a pivot abuts on said other end.

9. The roller cam follower of an engine according to claim 6, wherein
a rocker arm is pivotably attached to a rotational shaft located between one end and the other end of said rocker arm, an end of an open/close valve of said engine abuts on said one end, said other end abuts on one end of an interlocking rod transmitting a stress from said cam, said cam follower body is mounted on the other end of said interlocking rod, said one end and said other end of said interlocking rod being located respectively on said rocker arm and said cam, and said roller shaft is attached to said cam follower body and abuts on said cam.

10. The roller cam follower of an engine according to claim 6, wherein said bearing elements are full type needle bearings.

11. The roller cam follower of an engine according to claim 6, wherein said roller shaft has its end with a hardness lower than that of its central portion.

12. The roller cam follower of an engine according to claim 6, wherein said roller shaft has its end which is caulked.

13. The roller cam follower of an engine according to claim 6, wherein said cam follower is entirely press-formed.

14. A roller cam follower of an engine comprising:
an outer ring being in rolling contact with a cam shaft of the engine;
a roller shaft located inside said outer ring and fixed to a cam follower body; and
bearing elements placed between said outer ring and said roller shaft, wherein
at least one of said outer ring, roller shaft and bearing elements contains a non-diffusible hydrogen content of at most 0.5 ppm, carbon in an amount of 0.95% to 1.10%, silicon in an amount of 0.15% to 0.35%, manganese in an amount of at most 0.5%, phosphorous in an amount of at most 0.025%, sulfur in an amount of at most 0.025%, chromium in an amount of 1.30% to 1.60%, and molybdenum in an amount of less than 0.08%, with the remainder formed of Fe and unavoidable impurities, has a carbonitrided layer and has a fracture stress of at least 2650 MPa, wherein
after at least one of said outer ring, roller shaft, and bearing elements is carbonitrided at a carbonitriding temperature equal to or higher than the A1 transformation temperature, said at least one of said outer ring, roller shaft and bearing elements is cooled to a temperature lower than the A1 transformation temperature and then heated to a quenching temperature of 790°–815° C. and thereby quenched.

15. The roller cam follower of an engine according to claim 14, wherein
said cam follower body is mounted on one end of a rocker arm, said rocker arm is pivotably attached to a rotational shaft located between said one end and the other end, one end of an open/close valve of said engine abuts on said other end, said cam follower body on said one end has a bifurcated roller supporting portion, and said roller shaft is fixed to said bifurcated roller supporting portion.

16. The roller cam follower of an engine according to claim 14, wherein
said cam follower body is mounted between one end and the other end of a rocker arm, said roller shaft is fixed in a roller hole extending between two sidewalls of the rocker arm, an end of an open/close valve of said engine abuts on said one end of said rocker arm, and a pivot abuts on said other end.

17. The roller cam follower of an engine according to claim 14, wherein
a rocker arm is pivotably attached to a rotational shaft located between one end and the other end of said rocker arm, an end of an open/close valve of said engine abuts on said one end, said other end abuts on one end of an interlocking rod transmitting a stress from said cam, said cam follower body is mounted on the other end of said interlocking rod, said one end and said other end of said interlocking rod being located respectively on said rocker arm and said cam, and said roller shaft is attached to said cam follower body and abuts on said cam.

18. The roller cam follower of an engine according to claim 14, wherein said bearing elements are full type needle bearings.

19. The roller cam follower of an engine according to claim 14, wherein said roller shaft has its end with a hardness lower than that of its central portion.

20. The roller cam follower of an engine according to claim 14, wherein said roller shaft has its end which is caulked.

21. The roller cam follower of an engine according to claim 14, wherein said cam follower is entirely press-formed.

22. A roller cam follower of an engine comprising:
an outer ring being in rolling contact with a cam shaft of the engine;
a roller shaft located inside said outer ring and fixed to a cam follower body; and
bearing elements placed between said outer ring and said roller shaft, wherein
at least one of said outer ring, roller shaft and bearing elements has a carbonitrided layer and contains a non-diffusible hydrogen content of at most 0.5 ppm, carbon in an amount of 0.95% to 1.10%, silicon in an amount of 0.15% to 0.35%, manganese in an amount of at most 0.5%, phosphorous in an amount of at most 0.025%, sulfur in an amount of at most 0.025%, chromium in an amount of 1.30% to 1.60%, and molybdenum in an amount of less than 0.08%, with the remainder formed of Fe and unavoidable impurities, wherein
after at least one of said outer ring, roller shaft, and bearing elements is carbonitrided at a carbonitriding temperature equal to or higher than the A1 transformation temperature, said at least one of said outer ring, roller shaft and bearing elements is cooled to a temperature lower than the A1 transformation temperature and then heated to a quenching temperature of 790°–815° C. and thereby quenched.

23. The roller cam follower of an engine according to claim 22, wherein
said cam follower body is mounted on one end of a rocker arm, said rocker arm is pivotably attached to a rotational shaft located between said one end and the other end, one end of an open/close valve of said engine abuts on said other end, said cam follower body on said one end has a bifurcated roller supporting portion, and said roller shaft is fixed to said bifurcated roller supporting portion.

24. The roller cam follower of an engine according to claim 22, wherein
said cam follower body is mounted between one end and the other end of a rocker arm, said roller shaft is fixed in a roller hole extending between two sidewalls of the rocker arm, an end of an open/close valve of said engine abuts on said one end of said rocker arm, and a pivot abuts on said other end.

25. The roller cam follower of an engine according to claim 22, wherein
a rocker arm is pivotably attached to a rotational shaft located between one end and the other end of said rocker arm, an end of an open/close valve of said engine abuts on said one end, said other end abuts on one end of an interlocking rod transmitting a stress from said cam, said cam follower body is mounted on the other end of said interlocking rod, said one end and said other end of said interlocking rod being located respectively on said rocker arm and said cam, and said roller shaft is attached to said cam follower body and abuts on said cam.

26. The roller cam follower of an engine according to claim 22, wherein said bearing elements are full type needle bearings.

27. The roller cam follower of an engine according to claim 22, wherein said roller shaft has its end with a hardness lower than that of its central portion.

28. The roller cam follower of an engine according to claim 22, wherein said roller shaft has its end which is caulked.

29. The roller cam follower of an engine according to claim 22, wherein said cam follower is entirely press-formed.

* * * * *